(12) United States Patent
Ohyama et al.

(10) Patent No.: US 7,751,000 B2
(45) Date of Patent: Jul. 6, 2010

(54) LIQUID CRYSTAL DISPLAY HAVING A PLURALITY OF RETARDATION FILMS IN REFLECTIVE AREAS AND METHOD FOR MANUFACTURING THE SAME

(75) Inventors: Tsuyoshi Ohyama, Tokyo (JP); Masato Imai, Kanagawa (JP); Kazuyuki Endo, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/277,461

(22) Filed: Mar. 24, 2006

(65) Prior Publication Data

US 2006/0187387 A1 Aug. 24, 2006

Related U.S. Application Data

(63) Continuation of application No. 10/714,133, filed on Nov. 14, 2003.

(30) Foreign Application Priority Data

Feb. 26, 2002 (JP) ............... P2002-049163
Nov. 18, 2002 (JP) ............... P2002-333364

(51) Int. Cl.
G02F 1/13363 (2006.01)
G02F 1/1335 (2006.01)

(52) U.S. Cl. ............... 349/114; 349/117; 349/119; 349/121; 349/129

(58) Field of Classification Search ............... 349/114, 349/117, 119, 121, 129
See application file for complete search history.

(56) References Cited

U.S. PATENT DOCUMENTS

| | | | |
|---|---|---|---|
| 5,929,955 A * | 7/1999 | Hsieh et al. ............... 349/106 |
| 6,169,590 B1 | 1/2001 | Abileah et al. | |
| 6,404,469 B1 | 6/2002 | Kitagawa et al. | |
| 6,570,634 B2 * | 5/2003 | Kim ............... 349/107 |
| 6,621,543 B2 | 9/2003 | Moon | |
| 6,657,689 B2 | 12/2003 | Baek | |
| 6,731,360 B2 * | 5/2004 | Roosendaal et al. ......... 349/113 |
| 6,771,334 B2 | 8/2004 | Kubota et al. | |
| 6,862,058 B2 | 3/2005 | Ikeno et al. | |
| 2001/0048496 A1 * | 12/2001 | Baek ............... 349/114 |
| 2004/0233362 A1 * | 11/2004 | Kashima ............... 349/117 |

FOREIGN PATENT DOCUMENTS

| | | |
|---|---|---|
| JP | 03-105318 | 5/1991 |
| JP | 03-191327 | 5/1991 |

(Continued)

OTHER PUBLICATIONS

Japanese Office Action issued on Jan. 8, 2008.

*Primary Examiner*—Andrew Schechter
(74) *Attorney, Agent, or Firm*—Sonnenschein Nath & Rosenthal LLP

(57) ABSTRACT

A liquid crystal display includes a pair of substrates and a liquid crystal layer interposed between the substrates and has a reflective area and a transmissive area. At least one of the substrates is provided with a retardation film whose phase difference differs between the reflective area and the transmissive area. Alternatively, at least one of the substrates is provided with a retardation film whose slow axis differs between the reflective area and the transmissive area.

12 Claims, 27 Drawing Sheets

FOREIGN PATENT DOCUMENTS

| | | |
|---|---|---|
| JP | 08-076148 | 3/1996 |
| JP | 09-090431 | 4/1997 |
| JP | 09-258210 | 10/1997 |
| JP | 10068816 A | 3/1998 |
| JP | 10-104609 | 4/1998 |
| JP | 11-258638 | 9/1999 |
| JP | 2000-187220 | 7/2000 |
| JP | 2001-221995 | 8/2001 |
| JP | 2001-222009 | 8/2001 |

* cited by examiner

FIG. 7A
FIG. 7B
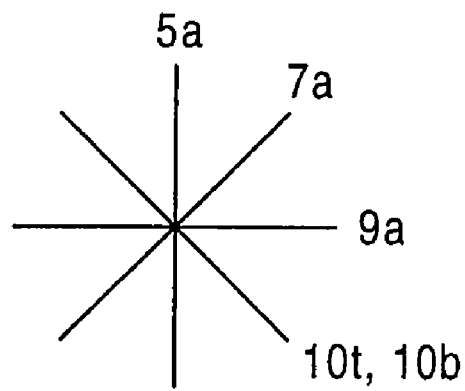
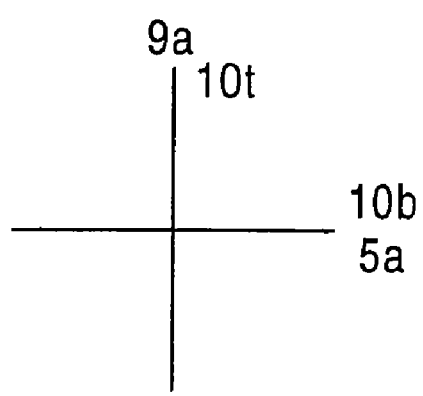
FIG. 7C
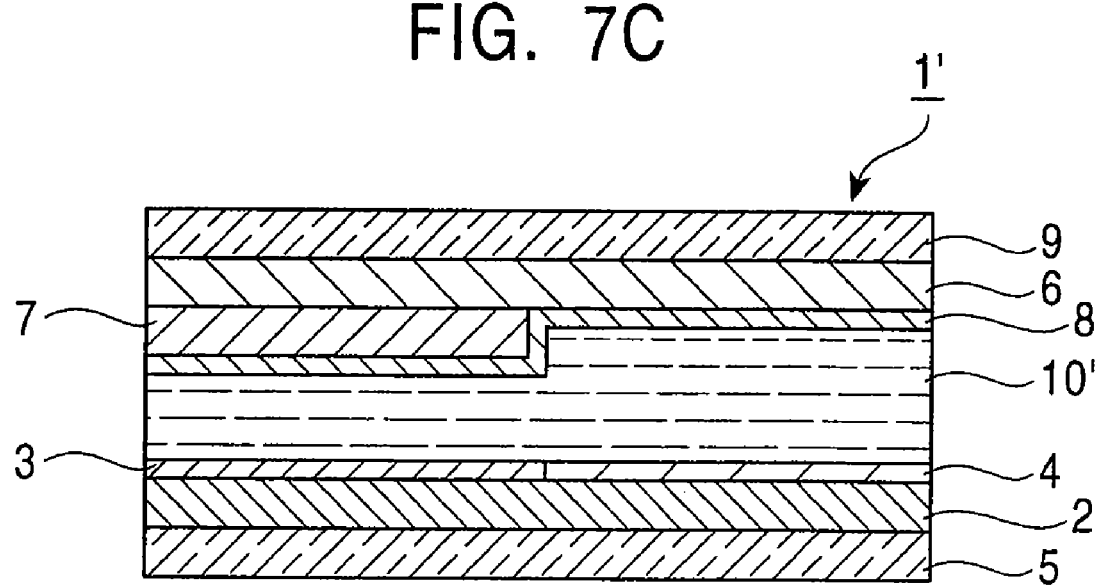

LIQUID CRYSTAL DISPLAY HAVING A PLURALITY OF RETARDATION FILMS IN REFLECTIVE AREAS AND METHOD FOR MANUFACTURING THE SAME

RELATED APPLICATION DATA

This application is a continuation of U.S. patent application Ser. No. 10/714,133, filed Nov. 14, 2003, which is incorporated herein by reference to the extent permitted by law. This application claims the benefit of priority to Japanese Patent Application No. JP2002-333364, filed Nov. 18, 2002, and Japanese Patent Application JP2002-049163, filed Feb. 26, 2002, which also are incorporated herein by reference to the extent permitted by law.

BACKGROUND OF THE INVENTION

1. Field of the Invention

The present invention relates to a transflective liquid crystal display having features of both reflective and transmissive displays and a method for manufacturing the transflective liquid crystal display.

2. Description of the Related Art

In general, transmissive liquid crystal displays using backlights for displaying images have been mainly used as displays for personal computers. Recently, however, there have been increasing demands for displays for mobile electronic devices such as personal digital assistants (PDAs) and mobile phones, and reflective liquid crystal displays which consume less power than the transmissive liquid crystal displays have been attracting attention. In the reflective liquid crystal displays, ambient light incident on and reflected by a reflector is used for displaying images, so no backlight is necessary and power consumption is low. Therefore, electronic devices including the reflective liquid crystal displays can be operated for a longer time compared to those including the transmissive liquid crystal displays.

For the case in which the reflective liquid crystal displays, which normally use ambient light for displaying images, are used in dark places, a construction has been proposed in which a front light is arranged on a display side, that is, on the front of a liquid crystal panel and light emitted from the front light is used for displaying images. However, when the front light is disposed on the display side of the panel, the reflectivity and the contrast decrease and the image quality degrades.

In order to solve this problem, transflective liquid crystal displays in which a reflector has a transmissive area in a pixel area and which have features of both the reflective and transmissive liquid crystal displays have been developed. In the transflective liquid crystal displays, a backlight is arranged on a liquid crystal panel on the side opposite to the display side, so that sufficient visibility can be obtained in both dark and light places without degrading the image quality as a reflective display. Accordingly, high image quality can be obtained. The basic construction of the transflective liquid crystal displays is disclosed in, for example, Japanese Unexamined Patent Application Publications Nos. 2000-29010 and 2000-35570.

With reference to FIG. 27, in a known transflective liquid crystal display 101, a reflective electrode 104 composed of a material with high reflectivity and a transparent electrode 105 composed of a material with high transmittance are provided on a main surface of a substrate 102, the reflective electrode 104 being laminated on the substrate 102 with an interlayer film 103 therebetween, and a quarter-wavelength layer (hereinafter called a $\lambda/4$ layer) 106 and a polarizer 107 are laminated on the other main surface of the substrate 102 in that order. In addition, in the liquid crystal display 101, a counter electrode 109 is provided on a main surface of another substrate 108 on the side facing the substrate 102, and a $\lambda/4$ layer 110 and a polarizer 111 are laminated on the other main surface of the substrate 108 in that order. A liquid crystal layer 112 composed of a liquid crystal material is interposed between the reflective electrode 104 and the counter electrode 109 and between the transparent electrode 105 and the counter electrode 109. Thus, the liquid crystal display 101 shown in FIG. 27 includes two retardation layers, one on the front and one on the back.

In order to reliably suppress the influence of chromatic dispersion and improve the dark state display, the construction shown in FIG. 28 may also be used. In a liquid crystal display 201 shown in FIG. 28, a $\lambda/4$ layer 106 and a half-wavelength layer (hereinafter called a $\lambda/2$ layer) 113 provided on a substrate 102 are used in combination with each other and a $\lambda/4$ layer 110 and a $\lambda/2$ layer 114 provided on a substrate 108 are used in combination with each other. Thus, four retardation layers are used in total.

In the liquid crystal display 101 shown in FIG. 27, the $\lambda/4$ layer 110 which serves as a retardation layer is provided on the display side of the substrate 108 such that it covers the entire area of the substrate 108 in order to suppress the influence of chromatic dispersion and achieve reflective display. Therefore, although a retardation layer such as a $\lambda/4$ layer is not necessary for transmissive display, since the $\lambda/4$ layer 110 which is provided on the display side for achieving reflective display covers the entire area of the substrate 108, the $\lambda/4$ layer 106 must be provided on the substrate 102 arranged on the back in order to compensate for the phase difference of the $\lambda/4$ layer 110. More specifically, since a retardation layer is provided on the display side for achieving reflective display even though it is not necessary for transmissive display, an additional retardation layer must be provided to compensate for the phase difference of the retardation layer arranged on the display side.

Similarly, in the liquid crystal display 201 shown in FIG. 28, two of the four retardation layers which are placed on the back are simply provided to compensate for the phase difference of the other two retardation layers used for reflective display, and are not necessary for transmissive display.

As described above, in known transflective liquid crystal displays, the required number of retardation layers is large compared to the reflective liquid crystal displays and the transmissive liquid crystal displays. Accordingly, high costs are incurred and the cell thickness is large.

SUMMARY OF THE INVENTION

Accordingly, in order to solve the above-described problems, an object of the present invention is to provide a transflective liquid crystal display which requires only a small number of retardation layers to be disposed on, for example, the back and a method for manufacturing the liquid crystal display.

In order to attain the above-described object, according to the present invention, a liquid crystal display includes a pair of substrates and a liquid crystal layer interposed between the substrates and has a reflective area and a transmissive area, and at least one of the substrates is provided with a retardation film whose phase difference differs between the reflective area and the transmissive area.

According to another aspect of the present invention, a method for manufacturing a liquid crystal display which has a pair of substrates and a liquid crystal layer interposed between the substrates and which has a reflective area and a transmissive area includes the steps of forming a retardation film on at least one of the substrates and patterning the retardation film such that the retardation film remains at least in the reflective area and the phase difference of the retardation film differs between the reflective area and the transmissive area.

According to the liquid crystal display having the above-described construction, the phase difference of the retardation film provided on one of the substrates differs between the reflective area and the transmissive area, and the retardation film, which is necessary for displaying images in the reflective area, does not function in the transmissive area. Accordingly, sufficient reflectivity can be obtained in the reflective area due to the function of the retardation film and transmissive display can be achieved in the transmissive area without providing an additional retardation layer to compensate for the phase difference of the retardation layer.

According to another aspect of the present invention, a liquid crystal display includes a pair of substrates and a liquid crystal layer interposed between the substrates and has a reflective area and a transmissive area, and at least one of the substrates is provided with a retardation film whose slow axis differs between the reflective area and the transmissive area.

In addition, according to another aspect of the present invention, a method for manufacturing a liquid crystal display which has a pair of substrates and a liquid crystal layer interposed between the substrates and which has a reflective area and a transmissive area includes the step of forming a retardation film whose slow axis is different between the reflective area and the transmissive area on at least one of the substrates.

According to the liquid crystal display having the above-described construction, the slow axis of the retardation film provided on one of the substrates differs between the reflective area and the transmissive area, and the retardation film, which is necessary for displaying images in the reflective area, does not function in the transmissive area. Accordingly, sufficient reflectivity can be obtained in the reflective area due to the function of the retardation film and transmissive display can be achieved in the transmissive area without providing an additional retardation layer to compensate for the phase difference of the retardation layer.

In the known transflective liquid crystal displays, a circular polarizer can be obtained by combining a polarizer and a λ/4 layer obtained by a single rubbing process and an exposure process, and the optical construction can therefore be easily designed. However, as described above, a relatively large number of retardation films are necessary and high costs are incurred. On the contrary, according to the present invention, retardation films necessary in the known construction can be omitted by providing a retardation layer whose phase difference differs between the transmissive area and the reflective area and optimizing the relationship between the rubbing direction of the retardation film and the transmission axis of the polarizer.

In addition, in the liquid crystal display of the present invention, images can be displayed in a twisted nematic mode, which is used in known transmissive liquid crystal displays, in the transmissive area. Accordingly, the contrast can be increased in transmissive display. In addition, in the reflective area, images can be displayed in an electrically controlled birefringence (ECB) mode where a twist angle is the same as or different from that in the transmissive area. Accordingly, the allowance for the cell gap increases, which leads to better productivity.

Accordingly, the present invention provides a transflective liquid crystal display which requires only a small number of retardation films and has a small cell thickness, and which can be manufactured at low costs.

BRIEF DESCRIPTION OF THE DRAWINGS

FIGS. 7A to 7C are diagrams showing the basic construction of a liquid crystal display according to a second embodiment of the present invention;

DESCRIPTION OF THE PREFERRED EMBODIMENTS

Liquid crystal displays to which the present invention is applied and methods for manufacturing the liquid crystal displays will be described below with reference to the accompanying drawings.

First Embodiment

A transflective liquid crystal display according to a first embodiment of the present invention will be described below. The liquid crystal display according to the first embodiment is characterized in that the phase difference of a retardation layer is different between a reflective area and a transmissive area. The basic construction of the liquid crystal display according to the first embodiment will be described below with reference to FIG. 1.

Figure 1:
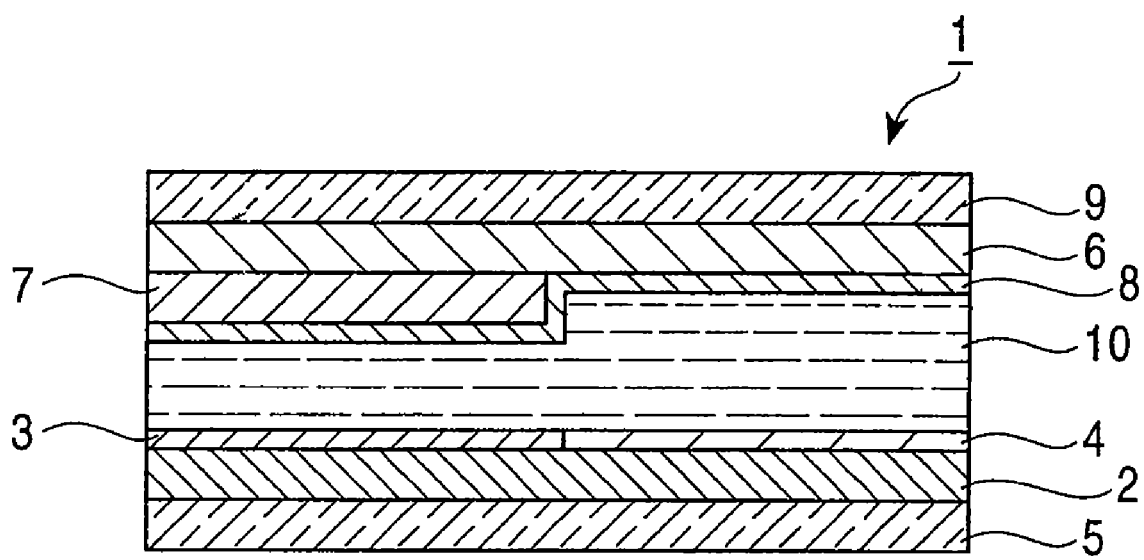
FIG. 1 is a schematic sectional view showing the basic construction of a liquid crystal display according to a first embodiment of the present invention.

In a liquid crystal display 1 shown in FIG. 1, a reflective electrode 3 composed of a material with high reflectivity which defines a reflective area and a transparent electrode 4 composed of a material with high transmittance which defines a transmissive area are provided on a main surface of a substrate 2, and a polarizer 5 is provided on the other main surface of the substrate 2. In addition, another substrate 6 which receives ambient light is placed on the display side, and a reflective-area $\lambda/4$ layer 7 which serves as a retardation layer and covers the reflective area and a counter electrode 8 which covers both the reflective and transmissive areas are provided on a main surface of the substrate 6 which faces the substrate 2. In addition, a polarizer 9 is provided on the other main surface of the substrate 6. A liquid crystal layer 10 composed of a liquid crystal material is interposed between the substrate 2 and the substrate 6, and a backlight (not shown) for transmissive display is disposed on the outer side of the polarizer 5. The transmission axis of the polarizer 9 and that of the polarizer 5 are perpendicular to each other. In addition, the slow axis of the reflective-area $\lambda/4$ layer 7 which serves as the retardation layer is at a predetermined angle with respect to the transmission axis or the absorption axis of the polarizer 9 (45° with respect to the transmission axis in the present embodiment).

In the liquid crystal display 1 according to the first embodiment, the reflective-area $\lambda/4$ layer 7 which serves as the retardation layer is provided only in the reflective area, and is not provided in the transmissive area. Accordingly, a phase difference is different between the reflective area and the transmissive area. More specifically, a phase difference necessary for reflective display is obtained due to the function of the reflective-area $\lambda/4$ layer 7 in the reflective area, whereas no phase difference occurs in the transmissive area. According to the above-described construction, transmissive display can be achieved without providing an additional $\lambda/4$ layer on the back to compensate for the phase difference of the reflective-area $\lambda/4$ layer 7 provided on the display side.

The reflective-area $\lambda/4$ layer 7 which serves as the retardation layer may also be disposed on the outer side of the substrate 6. However, it is preferably disposed on the surface facing the liquid crystal layer 10, as shown in FIG. 1, so that the problem of parallax caused by the thickness of the substrate 6 can be reduced.

The reflective-area $\lambda/4$ layer 7 which serves as the retardation layer is obtained by, for example, applying a liquid-crystal polymer to the substrate 6 after an alignment process, such as rubbing, and forming a pattern such that the liquid-crystal polymer remains only in the reflective area. More specifically, a photosensitive liquid-crystal polymer is applied to the substrate 6 after the alignment process, and an exposure process and a development process are performed so as to obtain the retardation layer having a desired pattern. Alternatively, the retardation layer may also be obtained by applying an ultraviolet-curable liquid crystal monomer in a nematic phase to the substrate 6 or an alignment film and irradiating it with an ultraviolet light to grow a liquid-crystal polymer. The phase difference of the retardation layer can be arbitrarily adjusted by changing the thickness thereof. The retardation layer is not necessarily composed of a liquid-crystal polymer, and may also be composed of, for example, an oriented film.

Figure 2:
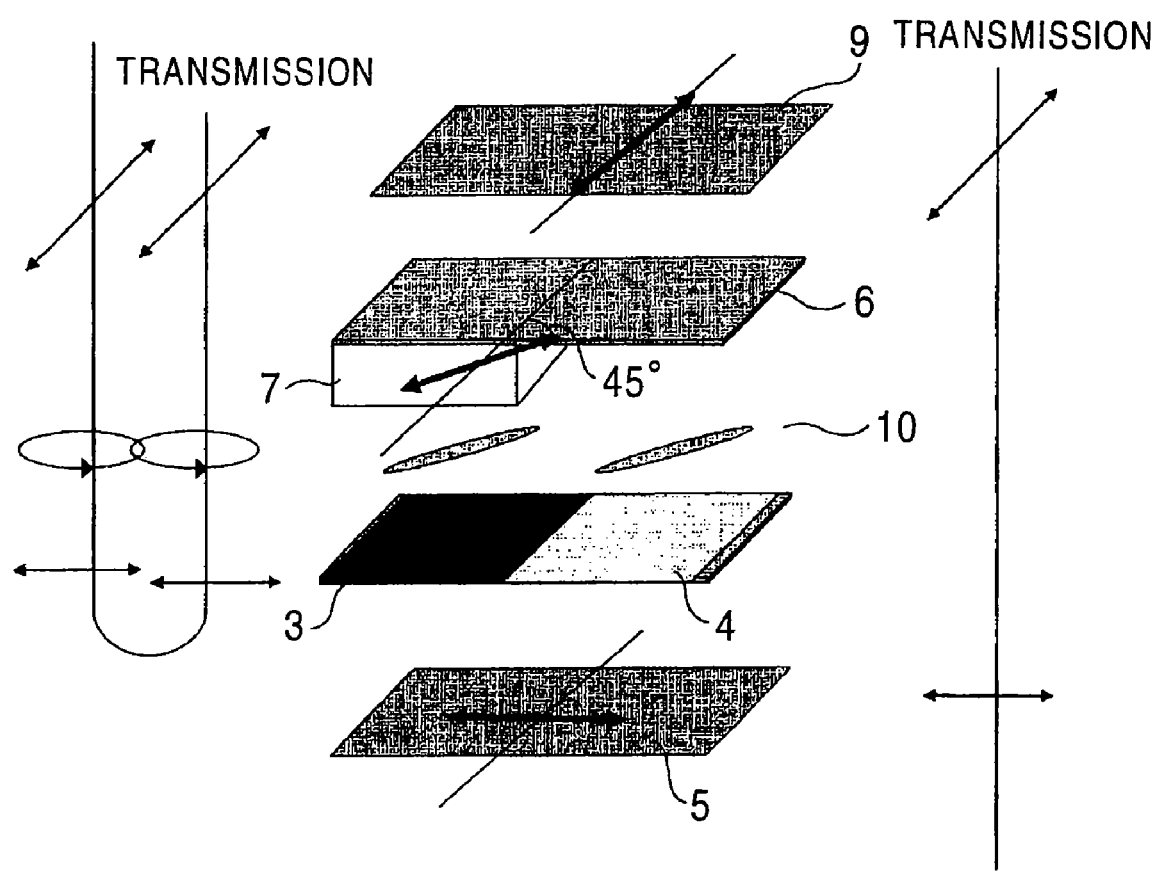
FIG. 2 is an exploded perspective view showing the optical construction of the liquid crystal display shown in FIG. 1 when no voltage is applied.
Figure 3:
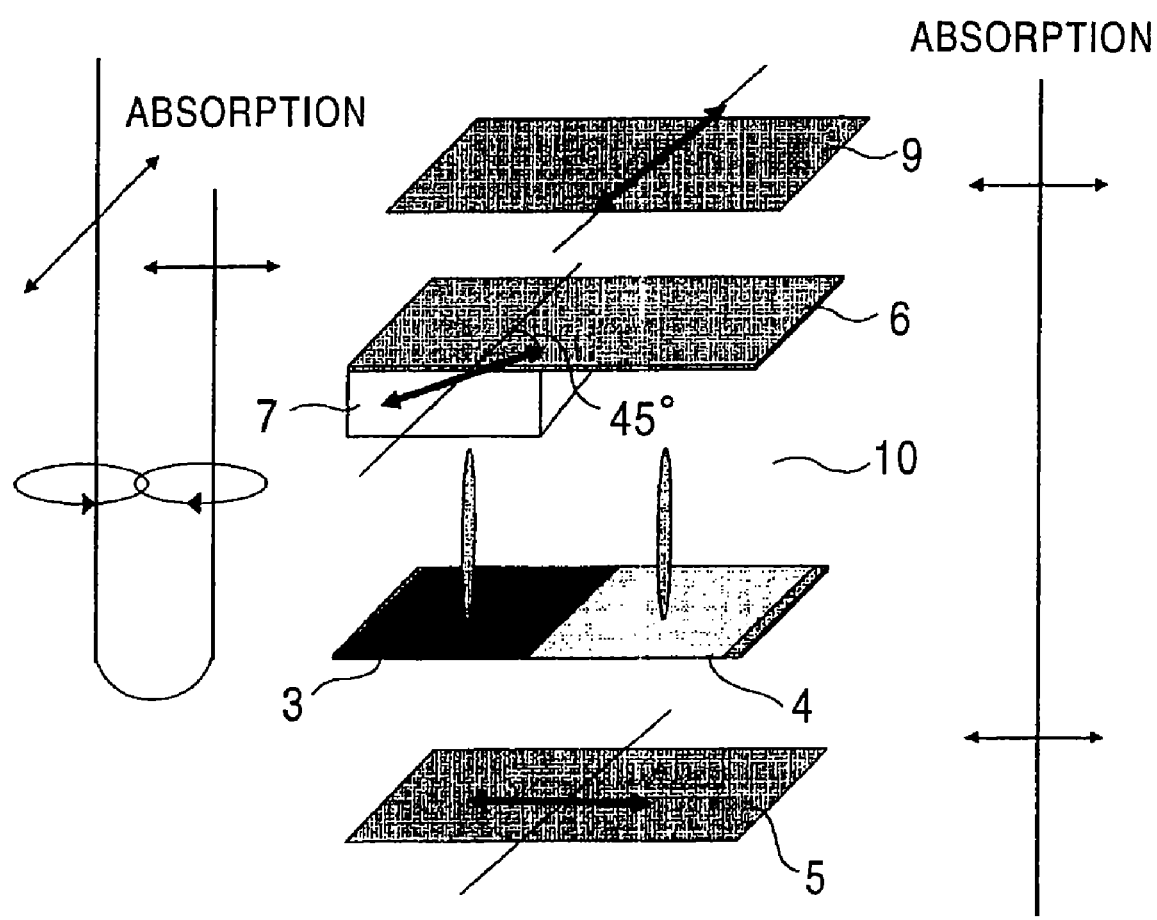
FIG. 3 is an exploded perspective view showing the optical construction of the liquid crystal display shown in FIG. 1 when a voltage is applied.

The operation of displaying an image on the liquid crystal display 1 shown in FIG. 1 will be described below with reference to FIGS. 2 and 3. For convenience, the substrate 2 and the counter electrode 8 are omitted in FIGS. 2 and 3. The phase difference of the liquid crystal layer 10 is adjusted to be $\lambda/4$, where $\lambda$ is the wavelength of light, in the reflective area and $\lambda/2$ in the transmissive area when light passes through the liquid crystal layer 10 once while no voltage is applied thereto. When no voltage is applied, the liquid-crystal orientation is approximately parallel to the substrates 2 and 6, is parallel to the alignment direction of the reflective-area $\lambda/4$ layer 7, and is at an angle of 45° with respect to the transmission axis of the polarizer 9.

A case in which no voltage is applied to the liquid crystal layer 10 and the light state is obtained will be described below with reference to FIG. 2.

In the reflective area, ambient light is incident from the outer side of the substrate 6 (from the display side) and passes through the polarizer 9, where it is linearly polarized in a direction parallel to the transmission axis of the polarizer 9. The linearly polarized light is converted into circularly polarized light as it passes through the reflective-area $\lambda/4$ layer 7, is converted into linearly polarized light by the liquid crystal layer 10, and reaches the reflective electrode 3. The linearly polarized light is reflected by the reflective electrode 3 so that the traveling direction thereof is reversed, and is converted into circularly polarized light as it passes through the liquid crystal layer 10 again. The circularly polarized light passes through the reflective-area $\lambda/4$ layer 7 again, where it is linearly polarized in the direction parallel to the transmission axis of the polarizer 9, and passes through the polarizer 9.

In the transmissive area, light emitted from the backlight is incident from the outer side of the substrate 2 (from the back) and passes through the polarizer 5, where it is linearly polarized in a direction parallel to the transmission axis of the polarizer 5. The linearly polarized light passes through the liquid crystal layer 10 having the phase difference of λ/2, where it is linearly polarized in a direction perpendicular to the transmission axis of the polarizer 5, that is, in the direction parallel to the transmission axis of the polarizer 9, and passes through the polarizer 9.

Next, a case in which a voltage is applied to the liquid crystal layer 10 and the dark state is obtained will be described below with reference to FIG. 3.

In the reflective area, ambient light is incident from the display side and passes through the polarizer 9, where it is linearly polarized in the direction parallel to the transmission axis of the polarizer 9. The linearly polarized light is converted into circularly polarized light as it passes through the reflective-area λ/4 layer 7. The circularly polarized light passes through the liquid crystal layer 10 and reaches the reflective electrode 3 without changing the polarization state thereof, and is reflected by the reflective electrode 3. When the circularly polarized light is reflected by the reflective electrode 3, the rotating direction thereof is reversed. The thus reflected circularly polarized light passes through the liquid crystal layer 10 again, is incident on the reflective-area λ/4 layer 7, where it is linearly polarized in a direction perpendicular to the transmission axis of the polarizer 9, and is absorbed by the polarizer 9.

In the transmissive area, light emitted from the backlight is incident from the back and passes through the polarizer 5, where it is linearly polarized in the direction parallel to the transmission axis of the polarizer 5. The linearly polarized light passes through the liquid crystal layer 10 and reaches the polarizer 9 without changing the polarization state thereof, and is absorbed by the polarizer 9.

As described above, the reflective-area λ/4 layer 7, which is necessary for the dark state display in the reflective area, is not provided in the transmissive area. Accordingly, sufficient reflectivity can be obtained in the reflective area due to the function of the reflective-area λ/4 layer 7 and transmissive display can be achieved in the transmissive area without providing an additional retardation layer on the back to compensate for the phase difference of the retardation layer on the display side. Accordingly, high quality, high contrast images can be displayed in both reflective display and transmissive display. In addition, it is not necessary to provide an additional retardation layer on the back, so that the cell thickness can be reduced and costs can be reduced by the amount corresponding to the omitted retardation layer.

In the above description, liquid-crystal molecules in the liquid crystal layer are oriented approximately perpendicular to the substrates when a voltage is applied, and the liquid crystal layer has a phase difference of λ/4 in the reflective area and λ/2 in the transmissive area when no voltage is applied. According to the present invention, however, the construction of the liquid crystal display may also be opposite. More specifically, the liquid crystal layer may also have a phase difference of λ/4 in the reflective area and λ/2 in the transmissive area when a voltage is applied.

Figure 4:
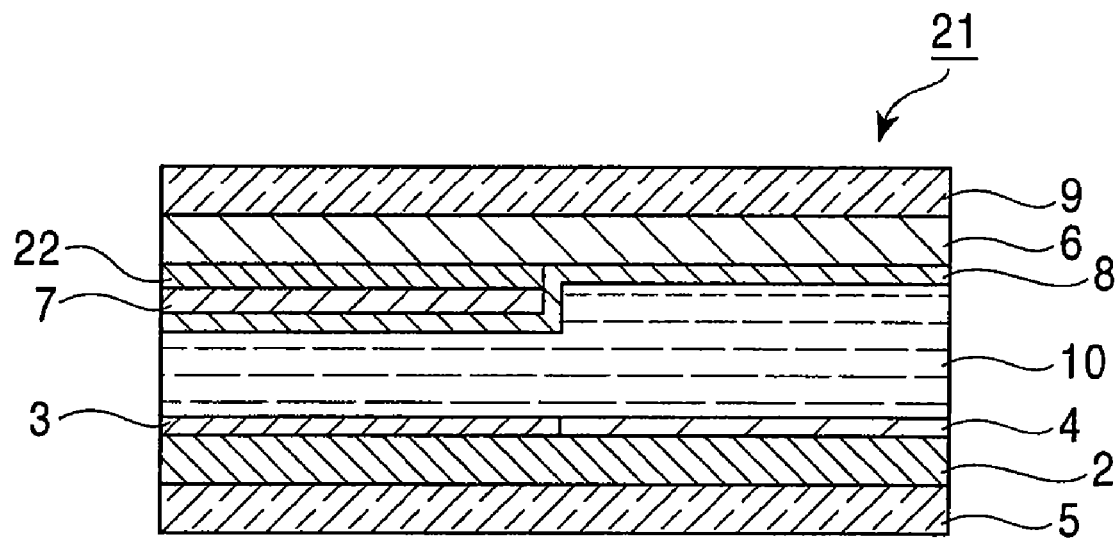
FIG. 4 is a schematic sectional view showing a modification of the liquid crystal display according to the first embodiment.

According to the present embodiment, the retardation layer is not limited to that having a single-layer structure consisting of the reflective-area λ/4 layer, and may also have a two-layer structure consisting of a reflective-area λ/4 layer and an additional retardation layer which compensates for the chromatic dispersion of the reflective-area λ/4 layer. A case in which a λ/2 layer is provided as the retardation layer which compensates for the chromatic dispersion of the reflective-area λ/4 layer will be described below with reference to FIG. 4. In FIG. 4, components similar to those of the liquid crystal display 1 shown in FIG. 1 are denoted by the same reference numerals, and explanations thereof are thus omitted.

In a liquid crystal display 21 according to this modification, a retardation layer having a two-layer structure consisting of a reflective-area λ/2 layer 22 and a reflective-area λ/4 layer 7 is provided in the reflective area, and no retardation layer is provided in the transmissive area.

As described above, in the liquid crystal display 21, the retardation layer having a two-layer structure is provided in the reflective area. Accordingly, in addition to the effects obtained by the liquid crystal display 1 having the basic structure, light leakage caused by the chromatic dispersion in the dark state display can be eliminated over a wide wavelength range and the image quality can be improved.

Figure 5:
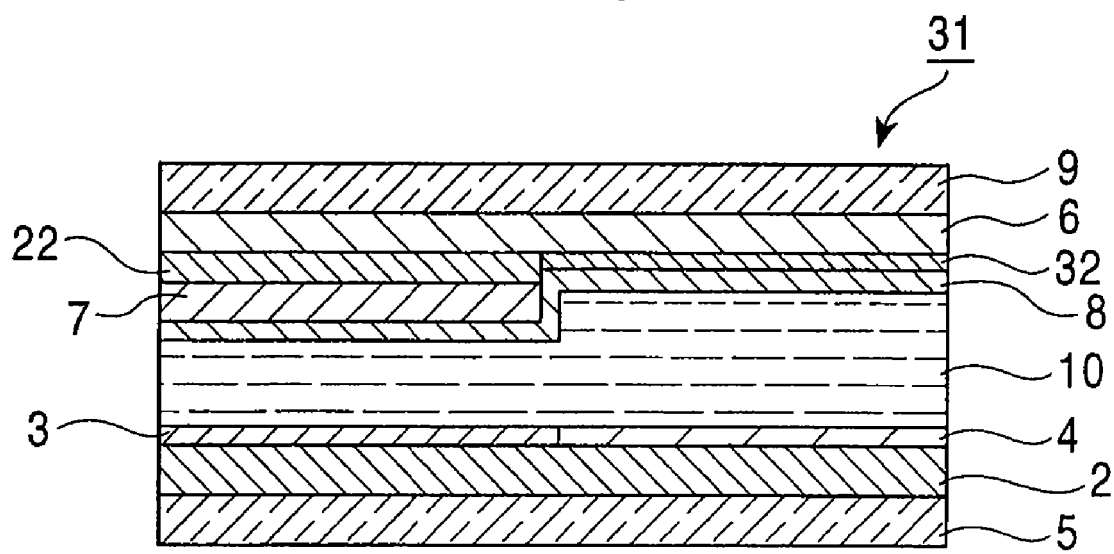
FIG. 5 is a schematic sectional view showing another modification of the liquid crystal display according to the first embodiment.

In the above-described liquid crystal displays 1 and 21, the retardation layer is completely removed in the transmissive area. According to the present invention, however, a retardation layer whose phase difference is different from that of the retardation layer provided in the reflective area may also be provided in the transmissive area. A liquid crystal display according to this modification will be described below with reference to FIG. 5. In FIG. 5, components similar to those of the liquid crystal display 1 shown in FIG. 1 and those of the liquid crystal display 21 shown in FIG. 4 are denoted by the same reference numerals, and explanations thereof are thus omitted.

A liquid crystal display 31 shown in FIG. 5 is different from the liquid crystal display 21 shown in FIG. 4 in that a transmissive-area retardation layer 32 is provided on a substrate 6 on the side facing a liquid crystal layer 10. The phase difference of the transmissive-area retardation layer 32 is determined by taking various characteristics of the liquid crystal layer 10 into account, and is preferably set such that a residual phase difference which occurs when sufficient voltage is applied to the liquid crystal layer 10 can be canceled.

Accordingly, in the liquid crystal display 31, in addition to the effects obtained by the above-described liquid crystal display 21, the darkness in the dark state display can be increased in the transmissive area and the image quality can be improved.

In this modification, a retardation layer having a two-layer structure consisting of a reflective-area λ/4 layer 7 and a reflective-area λ/2 layer 22 is provided in the reflective area. However, the effects obtained by providing the transmissive-area retardation layer 32 can also be obtained when a retardation layer having a single-layer structure is provided in the reflective area.

Figure 6:
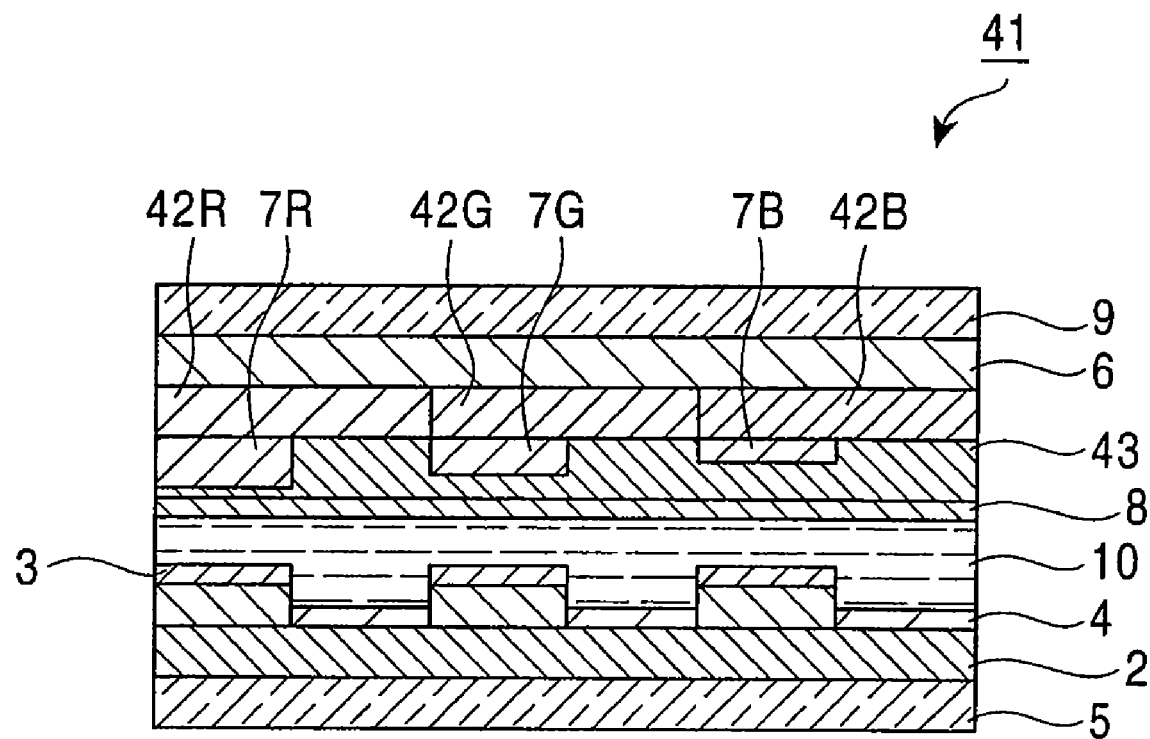
FIG. 6 is a schematic sectional view showing another modification of the liquid crystal display according to the first embodiment.

According to the present embodiment, the liquid crystal display may also be a full-color liquid crystal display, as shown in FIG. 6.

In a liquid crystal display 41 shown in FIG. 6, color filters 42R, 42G, and 42B corresponding to red, green, and blue dots, respectively, are provided on a substrate 6 on the side facing a liquid crystal layer 10. In addition, reflective-area λ/4 layers 7R, 7G, and 7B which serve as retardation layers are provided on the color filters 42R, 42G, and 42B, respectively, at regions corresponding to the reflective area. In addition, a counter electrode 8 is provided on these reflective-area retardation layers with an overcoat layer 43 therebetween.

In the liquid crystal display 41 according to this modification, the thicknesses of the reflective-area λ/4 layers 7R, 7G, and 7B which serve as the retardation layers are adjusted in accordance with the transmission wavelengths of the color filters 42R, 42G, and 42B, respectively, so that each retardation layer has a phase difference of λ/4. Accordingly, the influence of the chromatic dispersion of each color can be reduced and the image quality can be improved.

In the above descriptions, liquid crystal displays in which the retardation layer is provided on the substrate arranged on the display side are explained. However, the present invention is not limited to this, and is applicable as long as a retardation layer whose phase difference is different between the reflective area and the transmissive area is provided on at least one of the substrates. For example, the present invention may also be applied to a case where the retardation layer is provided on the substrate adjacent to the backlight.

Second Embodiment

A transflective liquid crystal display according to a second embodiment of the present invention will be described below. The liquid crystal display according to the second embodiment is similar to that of the first embodiment except for the orientation of the liquid crystal layer, that is, the orientation of the liquid-crystal molecules or the liquid-crystal orientation, in the reflective area and the transmissive area. The basic construction of the liquid crystal display according to the second embodiment will be described below with reference to FIGS. 7A to 7C. In the figures, components similar to those of the liquid crystal display 1 shown in FIG. 1 are denoted by the same reference numerals, and explanations thereof are thus omitted. FIG. 7C shows a schematic sectional view of the main part of a liquid crystal display 1', and FIGS. 7A and 7B show the optical constructions in a reflective area and a transmissive area, respectively, of the liquid crystal display 1'. In FIGS. 7A and 7B and the following figures which show the optical constructions, the liquid-crystal orientation on the side facing a substrate 6 is denoted by 10$t$ and the liquid-crystal orientation on the side facing a substrate 2 is denoted by 10$b$. In addition, the transmission axes of polarizers 5 and 9 are denoted by 5$a$ and 9$a$, respectively.

With reference to FIGS. 7A to 7C, in the liquid crystal display 1', the liquid-crystal orientations 10$t$ and 10$b$ in the reflective area are set similarly to, for example, those of the liquid crystal display 1 shown in FIG. 1. More specifically, when no voltage is applied to a liquid crystal layer 10', the liquid-crystal orientations 10$t$ and 10$b$ in the reflective area are parallel to the substrates 2 and 6 and are at an angle of 45° with respect to the transmission axes of the polarizers 5 and 9. In addition, similar to the liquid crystal display 1 shown in FIG. 1, the liquid crystal layer 10' in the reflective area is adjusted such that the phase difference is λ/4 when light passes through the liquid crystal layer 10' once while no voltage is applied thereto.

In the transmissive area, the liquid-crystal orientation 10$t$ on the side facing the substrate 6 is parallel to the transmission axis 9$a$ of the polarizer 9 and the liquid-crystal orientation 10$b$ on the side facing the substrate 2 is parallel to the transmission axis 5$a$ of the polarizer 5, so that a 90° twisted nematic state where the liquid-crystal molecules are twisted by 90° is obtained, when no voltage is applied to the liquid crystal layer 10'.

When a voltage is applied to the liquid crystal layer 10', the liquid-crystal molecules are aligned approximately perpendicular to the substrates 2 and 6 in both the reflective area and the transmissive area.

Accordingly, in the liquid crystal display 1', the alignment directions of alignment films (not shown) disposed between the substrates 2 and 6 so as to face the liquid crystal layer 10' are set as described below. That is, in the reflective area, the alignment directions of the alignment films adjacent to the substrates 2 and 6 are at an angle of 45° with respect to the transmission axes 5$a$ and 9$a$ of the polarizers 5 and 9, respectively. Accordingly, the alignment directions of the alignment films may either be at an angle of 90° with respect to the slow axis 7$a$ of a reflective-area λ/4 layer 7, as shown in FIG. 7A, or be parallel to the slow axis 7$a$ of the reflective-area λ/4 layer 7. In the transmissive area, the alignment direction of the alignment film adjacent to the substrate 2 is parallel to the transmission axis 5$a$ of the polarizer 5, and the alignment direction of the alignment film adjacent to the substrate 6 is parallel to the transmission axis 9$a$ of the polarizer 9.

Figure 8:
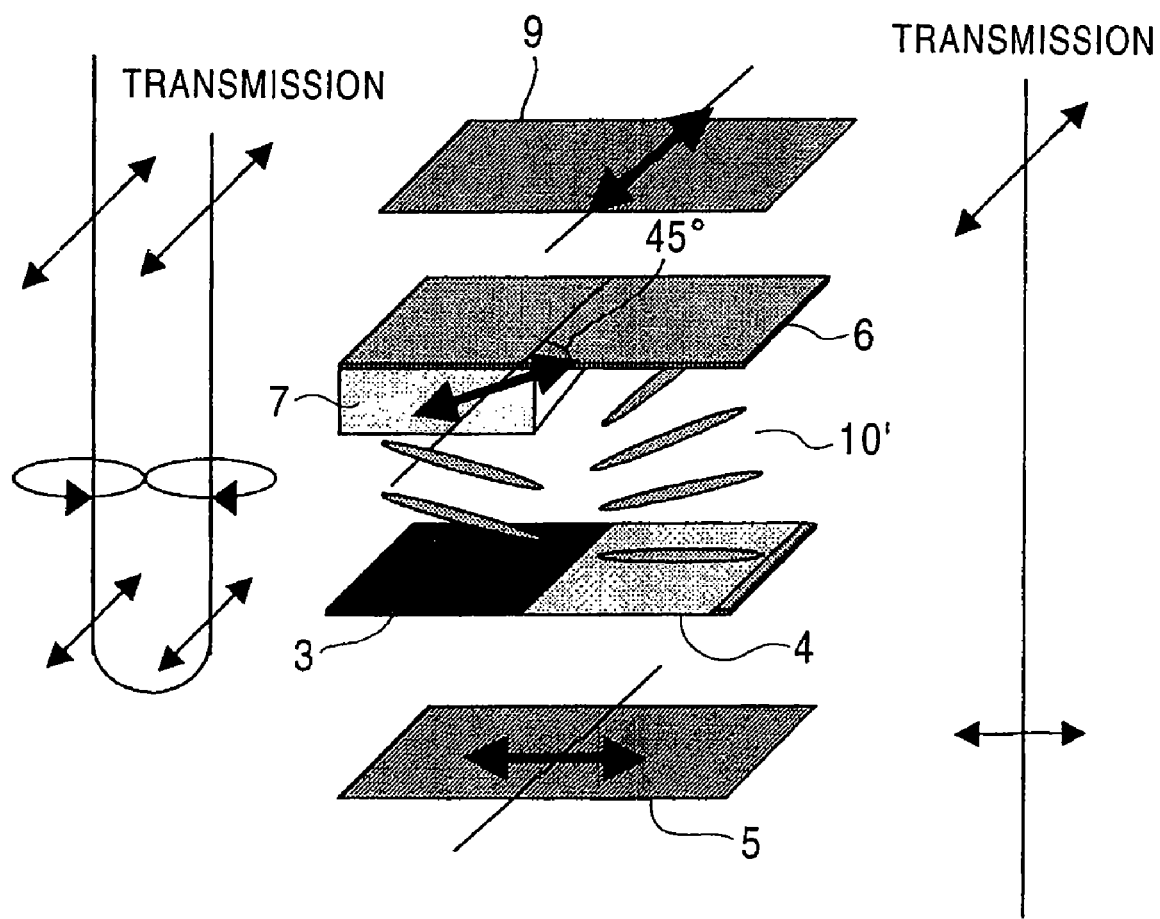
FIG. 8 is an exploded perspective view showing the optical construction of the liquid crystal display shown in FIGS. 7A to 7C when no voltage is applied.
Figure 9:
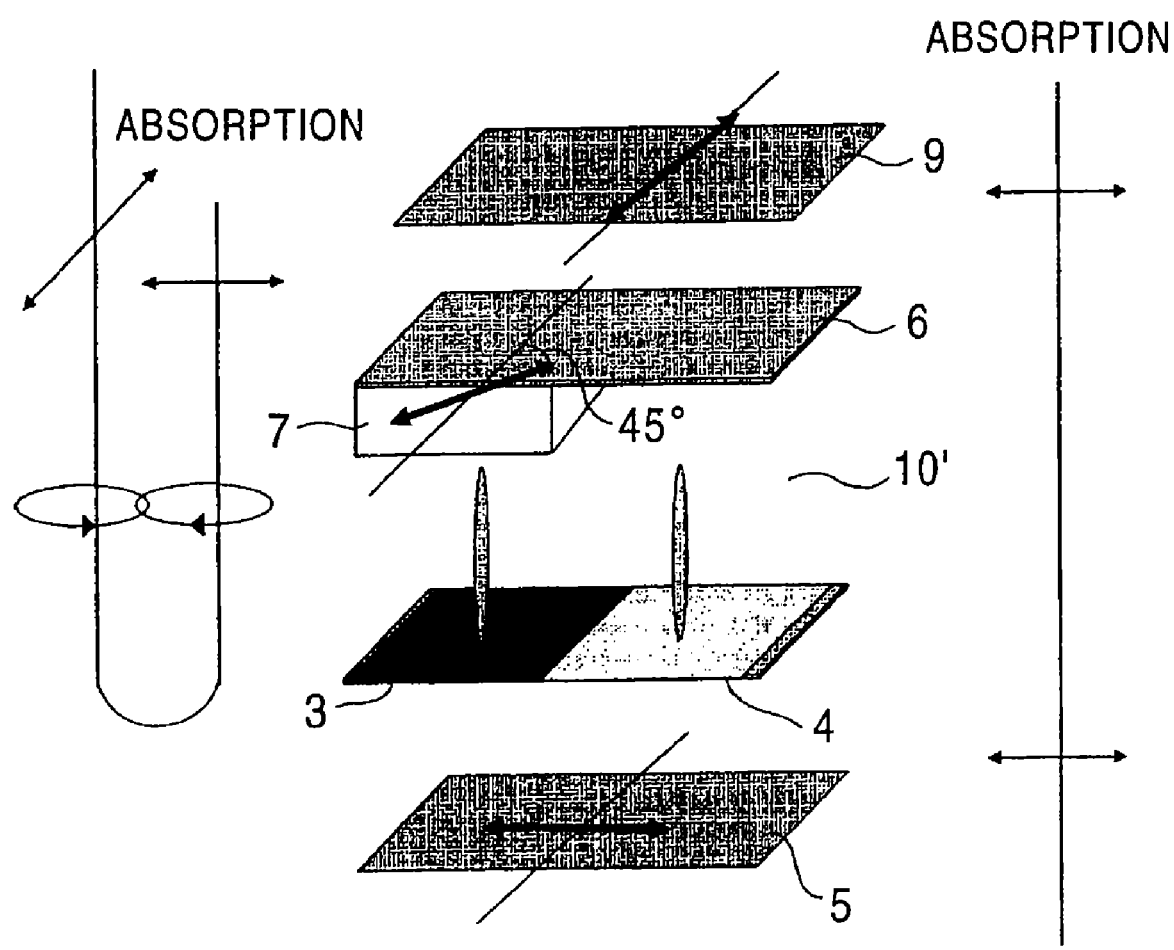
FIG. 9 is an exploded perspective view showing the optical construction of the liquid crystal display shown in FIGS. 7A to 7C when a voltage is applied.

The operation of displaying an image on the liquid crystal display 1' shown in FIGS. 7A to 7C will be described below with reference to FIGS. 8 and 9. For convenience, the substrate 2, a counter electrode 8, and the alignment films facing the liquid crystal layer 10' are omitted in FIGS. 8 and 9.

A case in which no voltage is applied to the liquid crystal layer 10' and the light state is obtained will be described below with reference to FIG. 8.

In the reflective area, ambient light is incident from the outer side of the substrate 6 (from the display side) and passes through the polarizer 9, where it is linearly polarized in a direction parallel to the transmission axis of the polarizer 9. The linearly polarized light is converted into circularly polarized light as it passes through the reflective-area λ/4 layer 7, is converted into linearly polarized light by the liquid crystal layer 10', and reaches a reflective electrode 3. The linearly polarized light is reflected by the reflective electrode 3 so that the traveling direction thereof is reversed, and is converted into circularly polarized light as it passes through the liquid crystal layer 10' again. The circularly polarized light passes through the reflective-area λ/4 layer 7 again, where it is linearly polarized in the direction parallel to the transmission axis of the polarizer 9, and passes through the polarizer 9.

In the transmissive area, light emitted from a backlight is incident from the outer side of the substrate 2 (from the back) and passes through the polarizer 5, where it is linearly polarized in a direction parallel to the transmission axis of the polarizer 5. The linearly polarized light passes through the liquid crystal layer 10' in the 90° twisted nematic state, where it is linearly polarized in a direction perpendicular to the transmission axis of the polarizer 5, that is, in the direction parallel to the transmission axis of the polarizer 9, and passes through the polarizer 9.

Next, a case in which a voltage is applied to the liquid crystal layer 10' and the dark state is obtained will be described below with reference to FIG. 9.

In the reflective area, ambient light is incident from the display side and passes through the polarizer 9, where it is linearly polarized in the direction parallel to the transmission axis of the polarizer 9. The linearly polarized light is converted into circularly polarized light as it passes through the reflective-area λ/4 layer 7. The circularly polarized light passes through the liquid crystal layer 10' and reaches the reflective electrode 3 without changing the polarization state thereof, and is reflected by the reflective electrode 3. When the circularly polarized light is reflected by the reflective electrode 3, the rotating direction thereof is reversed. The thus reflected circularly polarized light passes through the liquid crystal layer 10' again, is incident on the reflective-area λ/4 layer 7, where it is linearly polarized in a direction perpendicular to the transmission axis of the polarizer 9, and is absorbed by the polarizer 9.

In the transmissive area, light emitted from the backlight is incident from the back and passes through the polarizer 5, where it is linearly polarized in the direction parallel to the transmission axis of the polarizer 5. The linearly polarized light passes through the liquid crystal layer 10' and reaches the polarizer 9 without changing the polarization state thereof, and is absorbed by the polarizer 9.

In the liquid crystal display 1' which is constructed as described above, similar to the liquid crystal display 1 according to the first embodiment shown in FIG. 1, the reflective-area λ/4 layer 7, which is necessary for the dark state display in the reflective area, is not provided in the transmissive area. Accordingly, effects similar to those of the first embodiment can be obtained. In addition, since the liquid crystal layer is in the 90° twisted nematic state in the transmissive area, images can be displayed in a twisted nematic mode in the transmissive area and the contrast can be increased.

In the above description, the liquid-crystal molecules in the liquid crystal layer are oriented approximately perpendicular to the substrates when a voltage is applied, and the liquid-crystal layer has a phase difference of λ/4 in the reflective area and is in the 90° twisted nematic state in the transmissive area when no voltage is applied. According to the present invention, however, the construction of the liquid crystal display may also be opposite. More specifically, the liquid crystal layer may also have a phase difference of λ/4 in the reflective area and be in the 90° twisted nematic state in the transmissive area when a voltage is applied.

Figure 10A:
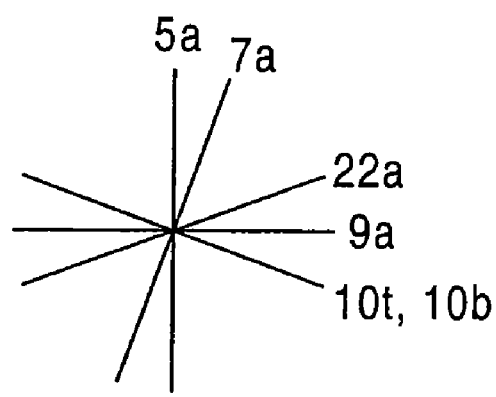
FIGS. 10A to 10C are diagrams showing a modification of the liquid crystal display according to the second embodiment.
Figure 10B:
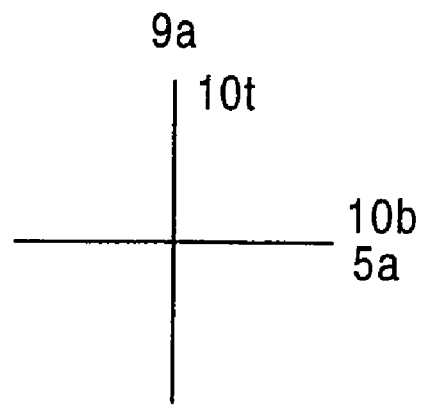
Figure 10C:
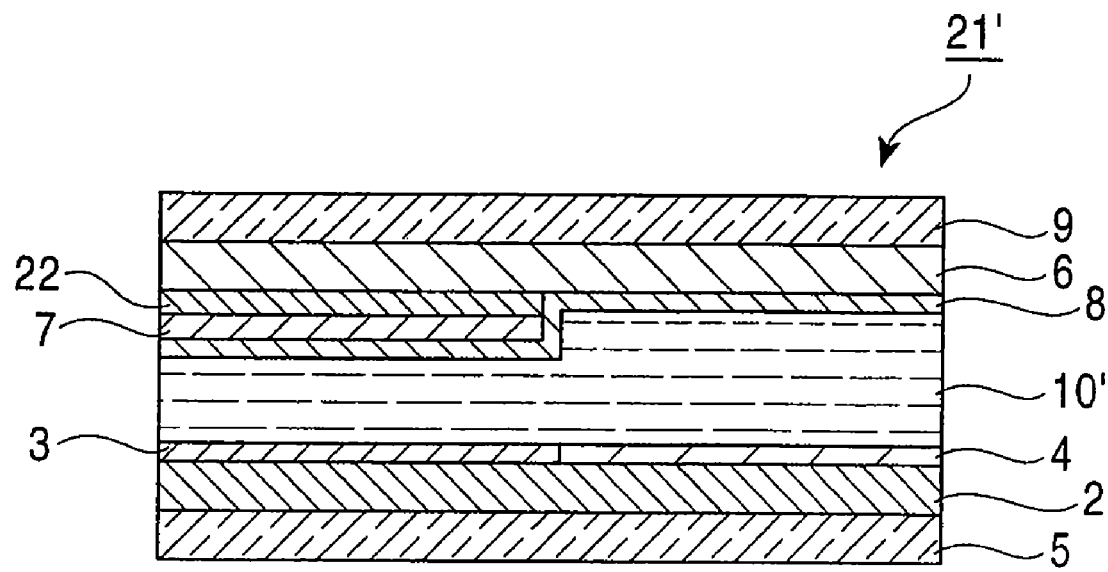

According to the second embodiment, the retardation layer is not limited to that having a single-layer structure consisting of the reflective-area λ/4 layer, and may also have a two-layer structure consisting of a reflective-area λ/4 layer and an additional retardation layer which compensates for the chromatic dispersion of the reflective-area λ/4 layer, as explained above with reference to FIG. 4 in the first embodiment. A case in which a λ/2 layer is provided as the retardation layer which compensates for the chromatic dispersion of the reflective-area λ/4 layer will be described below with reference to FIGS. 10A to 10C. FIG. 10C shows a schematic sectional view of the main part of a liquid crystal display 21', and FIGS. 10A and 10B show the optical constructions in a reflective area and a transmissive area, respectively, of the liquid crystal display 21'. In FIGS. 10A to 10C, components similar to those of the liquid crystal display 21 shown in FIG. 4 and those of the liquid crystal display 1' shown in FIGS. 7A to 7C are denoted by the same reference numerals, and explanations thereof are thus omitted.

In the liquid crystal display 21' according to this modification, a retardation layer having a two-layer structure consisting of a reflective-area λ/2 layer 22 and a reflective-area λ/4 layer 7 is provided in the reflective area, and no retardation layer is provided in the transmissive area. In this case, in order for the combination of the reflective-area λ/2 layer 22 and the reflective-area λ/4 layer 7 to serve as a λ/4 layer over a wide wavelength range, the angle between the slow axis 22a of the reflective-area λ/2 layer 22 and the slow axis 7a of the reflective-area λ/4 layer 7 is set to 60°, the angle between the slow axis 22a of the reflective-area λ/2 layer 22 and the transmission axis 9a (or the absorption axis) of the polarizer 9 to 15°, and the angle between the slow axis 7a of the reflective-area λ/2 layer 7 and the transmission axis 9a (or the absorption axis) of the polarizer 9 to 75°.

The liquid-crystal orientations 10t and 10b in the reflective area are adjusted such that the phase difference of the liquid crystal layer 10' is λ/4 when light passes through the liquid crystal layer 10' once while no voltage is applied thereto, and are preferably parallel or nearly perpendicular to the slow axis 7a of the reflective-area λ/4 layer 7 so that a residual retardation which occurs when a voltage is applied can be adjusted by the reflective-area λ/4 layer 7.

As described above, in the liquid crystal display 21', the retardation layer having a two-layer structure is provided in the reflective area. Accordingly, in addition to the effects obtained by the above-described liquid crystal display 1' having the basic structure, images can be displayed in an electrically controlled birefringence (ECB) mode in which light leakage caused by the chromatic dispersion in the dark state display is eliminated over a wide wavelength range in the reflective area, and the image quality can be improved.

Figure 11A:
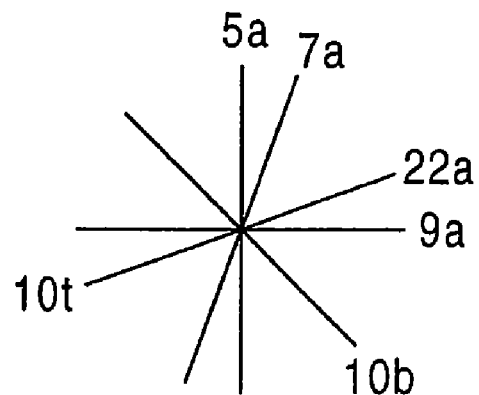
FIGS. 11A to 11C are diagrams showing another modification of the liquid crystal display according to the second embodiment.
Figure 11B:
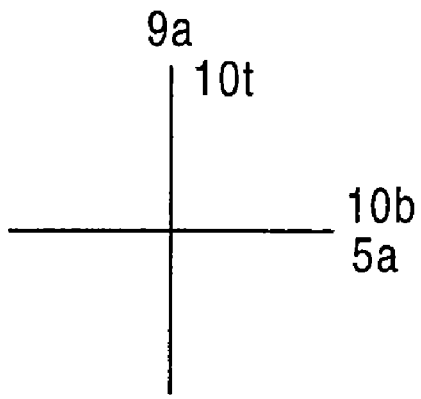
Figure 11C:
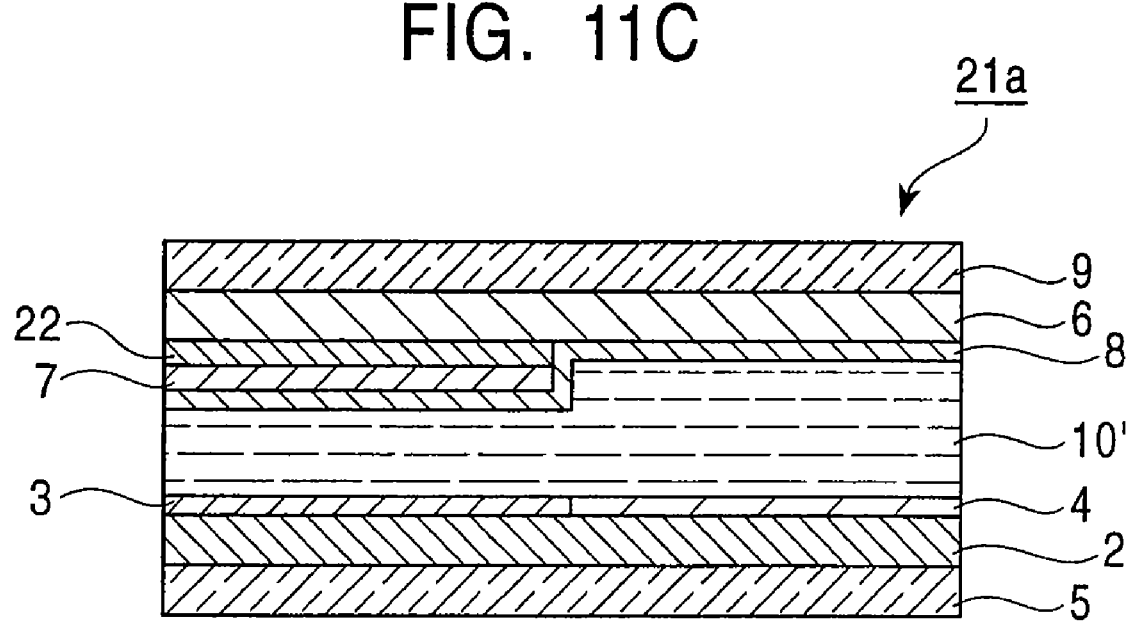

In the second embodiment, not only the liquid crystal layer 10' in the transmissive area but also the liquid crystal layer 10' in the reflective area may be in the twisted nematic state. The case in which the liquid crystal layer 10' in the transmissive area is also in the twisted nematic state will be described below with reference to FIGS. 11A to 11C. In FIGS. 11A to 11C, components similar to those of the liquid crystal display 21' shown in FIGS. 10A to 10C are denoted by the same reference numerals, and explanations thereof are thus omitted.

A liquid crystal display 21a according to this modification is similar to the liquid crystal display 21' described above with reference to FIGS. 10A to 10C except for the liquid-crystal orientations in the reflective area.

More specifically, in the liquid crystal display 21a shown in FIGS. 11A to 11C, the liquid-crystal orientations 10t and 10b in the reflective area are set such that a liquid crystal layer 10' is in a twisted-nematic state when no voltage is applied thereto. Accordingly, in the liquid crystal display 21a, an angle between the alignment directions of alignment films (not shown) disposed between substrates 2 and 6 so as to face the liquid crystal layer 10' is set to a predetermined angle. This angle is determined in accordance with the cell gap and the birefringence of the liquid crystal layer 10' such that the phase difference of the liquid crystal layer 10' is λ/4 when light passes through the liquid crystal layer 10' once while no voltage is applied thereto.

When a voltage is applied to the liquid crystal layer 10', the liquid-crystal molecules are aligned approximately perpendicular to the substrates 2 and 6, similar to the above-described cases.

When the liquid-crystal layer in the reflective area is in the twisted nematic state as described above, the effective phase difference of the liquid crystal layer in the reflective area decreases. Therefore, the cell gap for obtaining a phase difference of λ/4 in the reflective area increases and the allowance for the cell gap increases accordingly. As a result, the yield of the liquid crystal display can be increased.

Similar to the first embodiment, according to the second embodiment, the liquid crystal display may also be a full-color liquid crystal display. In addition, although the liquid crystal displays in which the retardation layer is provided on the substrate arranged on the display side are explained in the above descriptions, the present invention is not limited to this. The present invention is applicable as long as a retardation layer whose phase difference is different between the reflective area and the transmissive area is provided on at least one of the substrates. For example, the present invention may also be applied to a case where the retardation layer is provided on the substrate adjacent to the backlight.

The constructions described above in the second embodiment may also be used in combination with each other, and effects specific to the combined construction can be obtained in such a case.

Third Embodiment

Figure 12:
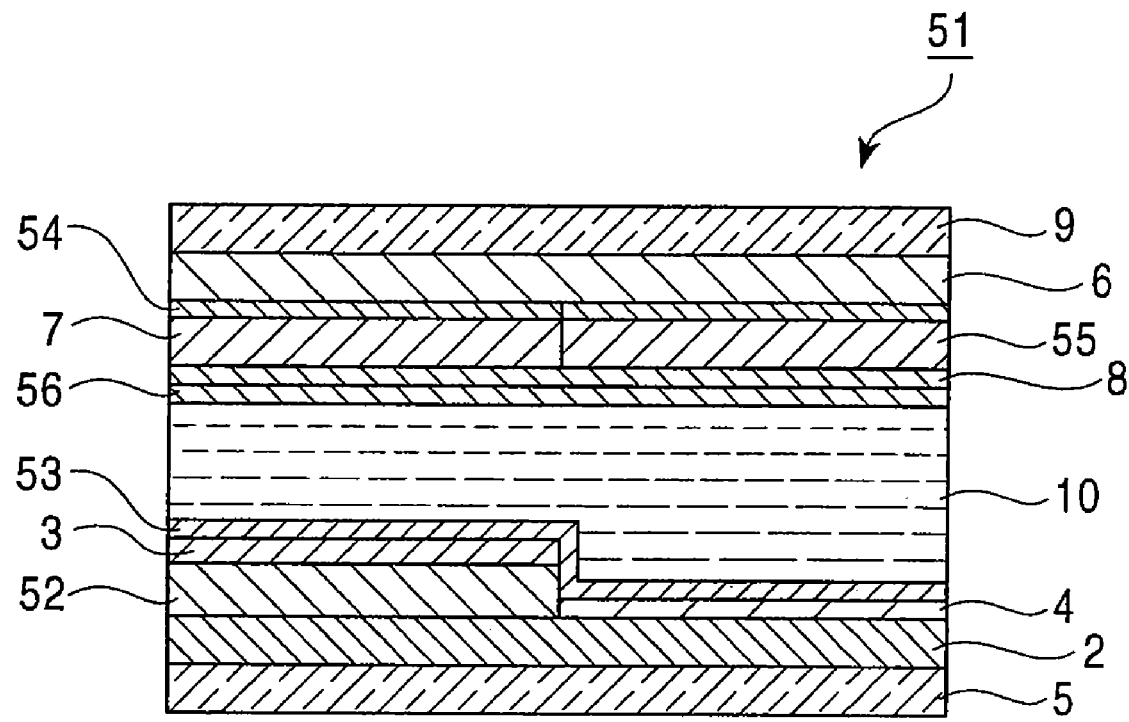
FIG. 12 is a schematic sectional view showing the basic construction of a liquid crystal display according to a third embodiment of the present invention.

Next, a transflective liquid crystal display according to a third embodiment of the present invention will be described below. The liquid crystal display according to the third embodiment is characterized in that the slow axis of a retardation layer is different between a reflective area and a transmissive area. The basic construction of the liquid crystal display according to the third embodiment will be described below with reference to FIG. 12. In FIG. 12, components similar to those of the liquid crystal display 1 shown in FIG. 1 are denoted by the same reference numerals, and explanations thereof are thus omitted.

In a liquid crystal display 51 shown in FIG. 12, a reflective electrode 3 composed of a material with high reflectivity which defines a reflective area and a transparent electrode 4 composed of a material with high transmittance which defines a transmissive area are provided on a main surface of a substrate 2. The reflective electrode 3 is laminated on the substrate 2 with an interlayer film 52 therebetween, and an alignment film 53 is laminated on the reflective electrode 3 and the transparent electrode 4. In addition, a polarizer 5 is provided on the other main surface of the substrate 2. Another substrate 6 which receives ambient light is placed on the display side, and a reflective-area $\lambda/4$ layer 7 which serves as a retardation layer and covers the reflective area and a transmissive-area $\lambda/4$ layer 55 which also serves as a retardation layer and covers the transmissive area are provided on a main surface of the substrate 6 which faces the substrate 2 with an alignment film 54 therebetween. In addition, a counter electrode 8 which covers both the reflective area and the transmissive area is provided on the reflective-area $\lambda/4$ layer 7 and the transmissive-area $\lambda/4$ layer 55, and an alignment film 56 is provided on the counter electrode 8. In addition, a polarizer 9 is provided on the other main surface of the substrate 6. A liquid crystal layer 10 composed of a liquid crystal material is interposed between the substrate 2 and the substrate 6, and a backlight (not shown) for transmissive display is disposed on the outer side the polarizer 5. The transmission axis of the polarizer 9 and that of the polarizer 5 are perpendicular to each other. In addition, the slow axis of the reflective-area $\lambda/4$ layer 7 which serves as the retardation layer in the reflective area is at an angle of 45° with respect to the transmission axis of the polarizer 9.

The slow axis of the transmissive-area $\lambda/4$ layer 55 which serves as the retardation layer in the transmissive area and that of the reflective-area $\lambda/4$ layer 7 which serves as the retardation layer in the reflective area extend in different directions. More specifically, the slow axis of the transmissive-area $\lambda/4$ layer 55 is parallel to the transmission axis of the polarizer 9 provided on the substrate 6. The reflective-area $\lambda/4$ layer 7 and the transmissive-area $\lambda/4$ layer 55 can be obtained by, for example, applying a liquid-crystal polymer or an ultraviolet-curable liquid crystal monomer in a nematic phase to the alignment film 54 on the substrate 6 which is subjected to multi-domain alignment in advance so that the alignment direction differs between the reflective area and the transmissive area. The multi-domain alignment may, of course, also be achieved by a photoalignment process, and the alignment film 54 can be omitted in such a case.

In the liquid crystal display 51 according to the third embodiment, a retardation layer which covers the entire area of the substrate 6 is subjected to multi-domain alignment so that the slow axis of the reflective-area $\lambda/4$ layer 7 and that of the transmissive-area $\lambda/4$ layer 55 are different from each other. Thus, only the reflective-area $\lambda/4$ layer 7 functions as a retardation layer. More specifically, the slow axis of the transmissive-area $\lambda/4$ layer 55 is parallel to the transmission axis of the polarizer 9 provided on the front, so that the transmissive-area $\lambda/4$ layer 55 does not have an effective phase difference. According to the above-described construction, transmissive display can be achieved without providing an additional $\lambda/4$ layer on the back to compensate for the phase difference of the reflective-area $\lambda/4$ layer 7.

The reflective-area $\lambda/4$ layer 7 and the transmissive-area $\lambda/4$ layer 55 which serve as the retardation layers may also be disposed on the outer side of the substrate 6. However, they are preferably disposed on the surface facing the liquid crystal layer 10, as shown in FIG. 12, so that the problem of parallax caused by the thickness of the substrate 6 can be reduced.

The reflective-area $\lambda/4$ layer 7 and the transmissive-area $\lambda/4$ layer 55 which serve as the retardation layers are obtained by, for example, applying a liquid-crystal polymer to the substrate 6 after an alignment process, such as rubbing. More specifically, a photosensitive liquid-crystal polymer is applied to the substrate 6 after the alignment process, and an exposure process and a development process are performed so as to obtain the retardation layers having a desired pattern. Alternatively, the retardation layers may also be obtained by applying an ultraviolet-curable liquid crystal monomer in a nematic phase to the substrate 6 or the alignment film and irradiating it with an ultraviolet light to grow a liquid-crystal polymer. In addition, the reflective-area $\lambda/4$ layer 7 and the transmissive-area $\lambda/4$ layer 55 may also be obtained by subjecting a film formed by applying a liquid-crystal polymer to a photoalignment process. The phase differences of the retardation layers can be arbitrarily adjusted by changing the thicknesses thereof. The retardation layers may also be composed of, for example, oriented films.

In the present embodiment, the slow axis of the retardation layer in the transmissive area may be parallel to any one of the transmission axis and the absorption axis of the polarizer on the display side and the transmission axis and the absorption axis of the polarizer on the back as long as the retardation layer in the transmissive area does not have an effective phase difference.

Figure 13:
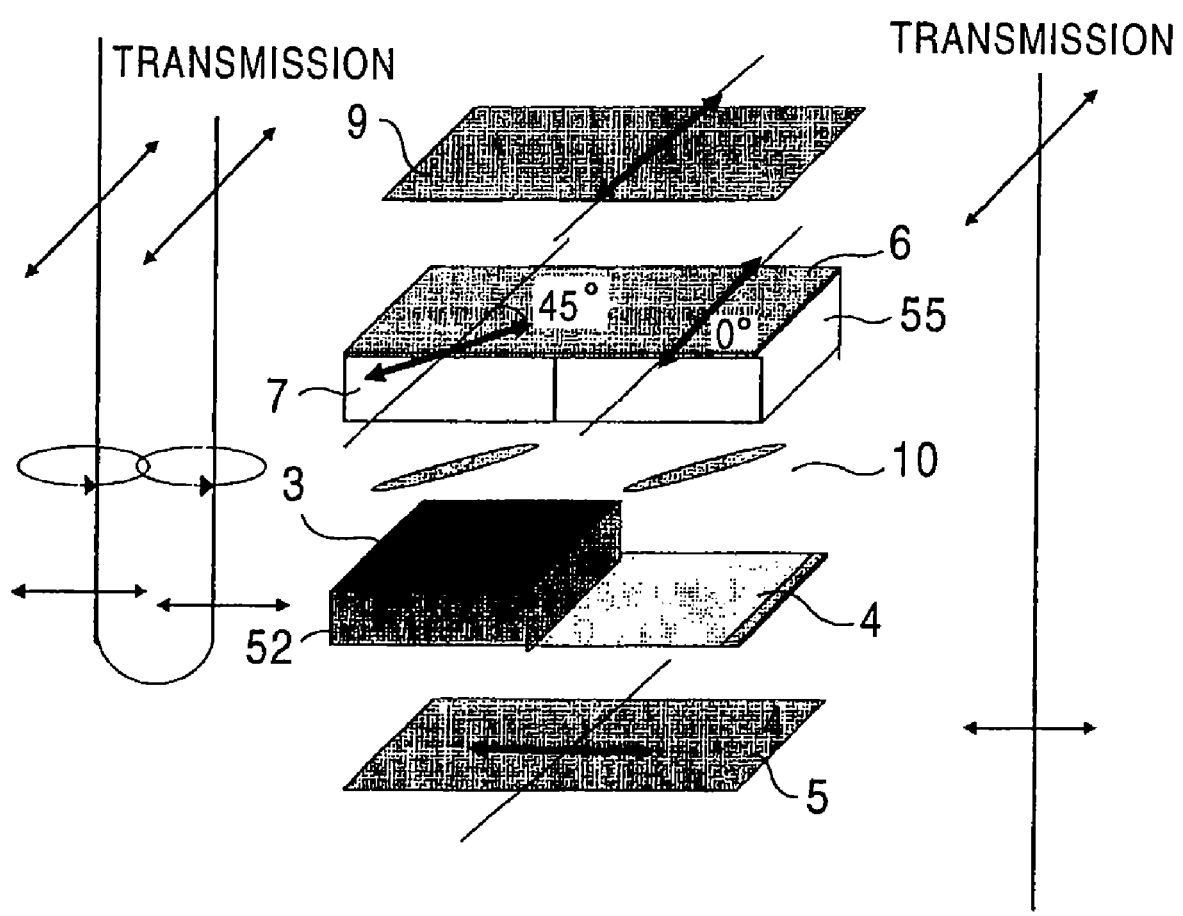
FIG. 13 is an exploded perspective view showing the optical construction of the liquid crystal display shown in FIG. 12 when no voltage is applied.
Figure 14:
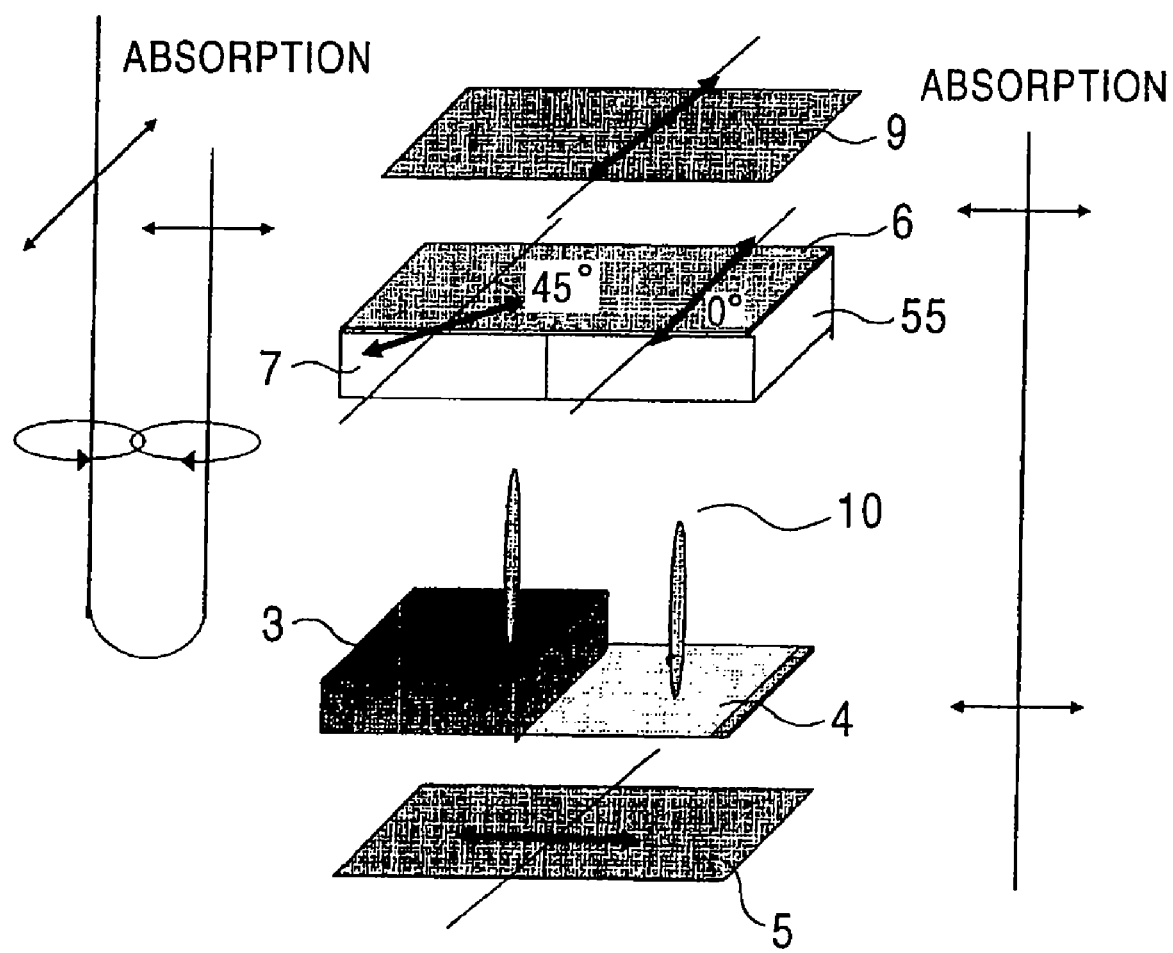
FIG. 14 is an exploded perspective view showing the optical construction of the liquid crystal display shown in FIG. 12 when a voltage is applied.

The operation of displaying an image on the liquid crystal display 51 shown in FIG. 12 will be described below with reference to FIGS. 13 and 14. For convenience, the substrate 2, the counter electrode 8, and the alignment films are omitted in FIGS. 13 and 14. In addition, the thickness of the liquid crystal layer 10 is adjusted such that the phase difference is $\lambda/4$ in the reflective area and $\lambda/2$ in the transmissive area when light passes through the liquid crystal layer 10 once while no voltage is applied thereto. When no voltage is applied, the liquid-crystal orientation is approximately parallel to the substrates 2 and 6 and is at an angle of 45° with respect to the transmission axis of the polarizer 9.

A case in which no voltage is applied to the liquid crystal layer 10 and the light state is obtained will be described below with reference to FIG. 13.

In the reflective area, ambient light is incident from the display side and passes through the polarizer 9, where it is linearly polarized in a direction parallel to the transmission axis of the polarizer 9. The linearly polarized light is converted into circularly polarized light as it passes through the reflective-area $\lambda/4$ layer 7, is converted into linearly polarized light by the liquid crystal layer 10, and reaches the reflective electrode 3. The linearly polarized light is reflected by the reflective electrode 3 so that the traveling direction thereof is reversed, and is converted into circularly polarized light as it passes through the liquid crystal layer 10 again. The circularly polarized light passes through the reflective-area $\lambda/4$ layer 7 again, where it is linearly polarized in the direction parallel to the transmission axis of the polarizer 9, and passes through the polarizer 9.

In the transmissive area, light emitted from the backlight is incident from the back and passes through the polarizer 5, where it is linearly polarized in a direction parallel to the transmission axis of the polarizer 5. The linearly polarized light passes through the liquid crystal layer 10 having the phase difference of λ/2, where it is linearly polarized in a direction perpendicular to the transmission axis of the polarizer 5, that is, in the direction parallel to the transmission axis of the polarizer 9, passes through the transmissive-area λ/4 layer 55 without changing the polarization state thereof, and passes through the polarizer 9.

Next, a case in which a voltage is applied to the liquid crystal layer 10 and the dark state is obtained will be described below with reference to FIG. 14.

In the reflective area, ambient light is incident from the display side and passes through the polarizer 9, where it is linearly polarized in the direction parallel to the transmission axis of the polarizer 9. The linearly polarized light is converted into circularly polarized light as it passes through the reflective-area λ/4 layer 7. The circularly polarized light passes through the liquid crystal layer 10 and reaches the reflective electrode 3 without changing the polarization state thereof, and is reflected by the reflective electrode 3. When the circularly polarized light is reflected by the reflective electrode 3, the rotating direction thereof is reversed. The thus reflected circularly polarized light passes through the liquid crystal layer 10 again, is incident on the reflective-area λ/4 layer 7, where it is linearly polarized in a direction perpendicular to the transmission axis of the polarizer 9, and is absorbed by the polarizer 9.

In the transmissive area, light emitted from the backlight is incident from the back and passes through the polarizer 5, where it is linearly polarized in the direction parallel to the transmission axis of the polarizer 5. The linearly polarized light passes through the liquid crystal layer 10 and the transmissive-area λ/4 layer 55 and reaches the polarizer 9 without changing the polarization state thereof, and is absorbed by the polarizer 9.

As described above, in the liquid crystal display 51, the slow axis of the transmissive-area λ/4 layer 55 is parallel to the transmission axis of the polarizer 9, so that the transmissive-area λ/4 layer 55 does not function as a retardation layer. Accordingly, sufficient reflectivity can be obtained in the reflective area due to the function of the reflective-area λ/4 layer 7 and transmissive display can be achieved in the transmissive area without providing an additional retardation layer on the back to compensate for the phase difference of the retardation layer on the display side. Accordingly, high quality, high contrast images can be displayed in both reflective display and transmissive display. In addition, it is not necessary to provide an additional retardation layer on the back, so that the cell thickness can be reduced and costs can be reduced by the amount corresponding to the omitted retardation layer.

In the above description, liquid-crystal molecules in the liquid crystal layer are oriented approximately perpendicular to the substrates when a voltage is applied, and the liquid crystal layer has a phase difference of λ/4 in the reflective area and λ/2 in the transmissive area when no voltage is applied. According to the present invention, however, the construction of the liquid crystal display may also be opposite. More specifically, the liquid crystal layer may also have a phase difference of λ/4 in the reflective area and λ/2 in the transmissive area when a voltage is applied.

Figure 15:
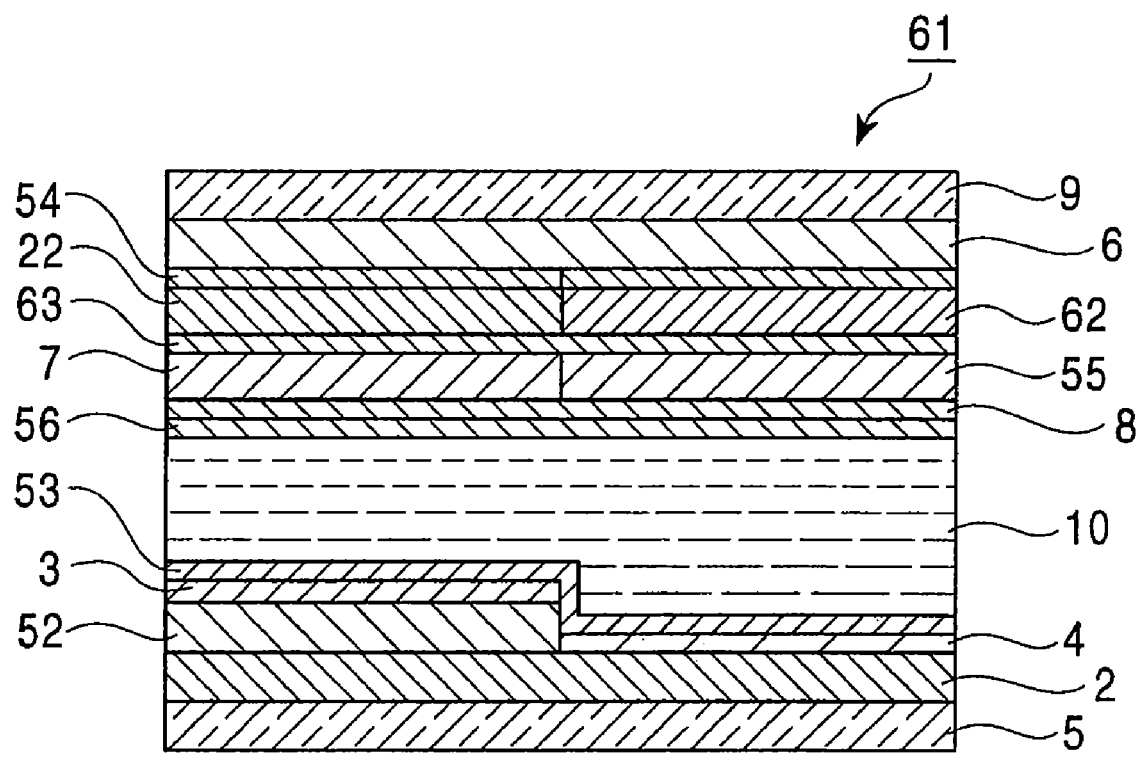
FIG. 15 is a schematic sectional view showing a modification of the liquid crystal display according to the third embodiment.

According to the present embodiment, the retardation layers are not limited to those having a single-layer construction consisting of the reflective-area λ/4 layer 7 and the transmissive-area λ/4 layer 55, and may also have a two-layer structure, as shown in FIG. 15. In FIG. 15, components similar to those of the liquid crystal display 51 shown in FIG. 12 are denoted by the same reference numerals, and explanations thereof are thus omitted.

In a liquid crystal display 61 according to this modification, a reflective-area λ/4 layer 7 and a transmissive-area λ/4 layer 55 which serve as retardation layers, a reflective-area λ/2 layer 22 which compensates for the chromatic dispersion of the reflective-area λ/4 layer 7, and a transmissive-area λ/2 layer 62 are provided on a substrate 6 on the side facing a liquid crystal layer 10. The slow axis of the retardation layer in the transmissive area is different from that of the retardation layer in the reflective area. More specifically, the transmissive-area λ/2 layer 62 and the reflective-area λ/4 layer 7 function as a λ/2 layer and a λ/4 layer, respectively, whereas the transmissive-area λ/2 layer 62 and the transmissive-area λ/4 layer 55 do not function as retardation layers since the slow axes thereof are parallel to, for example, the transmission axis of a polarizer 9. The retardation layers having the two-layer structure are obtained by, for example, the following processes. That is, first, the reflective-area λ/2 layer 22 and the transmissive-area λ/2 layer 62 are formed by applying a liquid-crystal polymer or an ultraviolet-curable liquid crystal monomer in a nematic phase to an alignment film 54 on the substrate 6 which is subjected to multi-domain alignment in advance so that the alignment direction differs between the reflective area and the transmissive area. Then, an alignment film 63, which is subjected to multi-domain alignment so that the alignment direction differs between the reflective area and the transmissive area, is provided on the λ/2 layers. Then, the reflective-area λ/4 layer 7 and the transmissive-area λ/4 layer 55 are formed by applying a liquid-crystal polymer or an ultraviolet-curable liquid crystal monomer in a nematic phase to alignment film 63. The multi-domain alignment may, of course, also be achieved by a photoalignment process.

As described above, the retardation layers have a two-layer structure, and the slow axis of the retardation layer in the reflective area is different from that of the retardation layer in the transmissive area. Thus, according to the liquid crystal display 61, in addition to the effects obtained by the liquid crystal display 51 having the basic structure of the present embodiment, light leakage caused by the chromatic dispersion in the dark state display can be eliminated over a wide wavelength range and the image quality can be improved.

The present invention is not limited to liquid crystal displays in which the retardation layers are provided on the substrate 6 arranged on the display side, and may also be applied to liquid crystal displays in which the retardation layers are provided on the substrate 2 adjacent to the backlight. For example, in a liquid crystal display 71 shown in FIG. 16, a reflective electrode 3 and a transparent electrode 4 are provided on a substrate 2 arranged on the back, and a reflective-area λ/4 layer 7 and a transmissive-area λ/4 layer 55 which serve as retardation layers are laminated on the reflective electrode 3 and the transparent electrode 4, respectively, with an alignment film 54 therebetween. The reflective-area λ/4 layer 7 and the transmissive-area λ/4 layer 55 are constructed similarly to those described with reference to FIG. 12.

In this case, a transparent electrode (not shown) for reliably driving the liquid crystal may be disposed between the reflective-area λ/4 layer 7 and an alignment film 53 for driving the liquid crystal and between the transmissive-area λ/4 layer 55 and the alignment film 53. When this transparent electrode is provided, a plug is provided for connecting the transparent electrode to thin-film transistors (TFTs). In addition, in this case, it is not necessary to provide the transparent electrode 4 between the substrate 2 and the transmissive-area λ/4 layer 55.

Although the reflective-area λ/4 layer 7 functions as a retardation layer, the transmissive-area λ/4 layer 55 does not function as a retardation layer since the slow axis thereof is parallel to, for example, the transmission axis of the polarizer 9. When the retardation layers are provided on the substrate adjacent to the backlight, as in the liquid crystal display 71 shown in FIG. 16, sufficient reflectivity can be obtained in the reflective area due to the function of the reflective-area λ/4 layer 7 and transmissive display can be achieved in the transmissive area without providing an additional retardation layer on the display side to compensate for the phase difference of the retardation layer on the back. Accordingly, similar to the above-described liquid crystal displays, high quality, high contrast images can be displayed in both reflective display and transmissive display. In addition, it is not necessary to provide an additional retardation layer on the display side, so that the cell thickness can be reduced and costs can be reduced by the amount corresponding to the omitted retardation layer.

Figure 17:
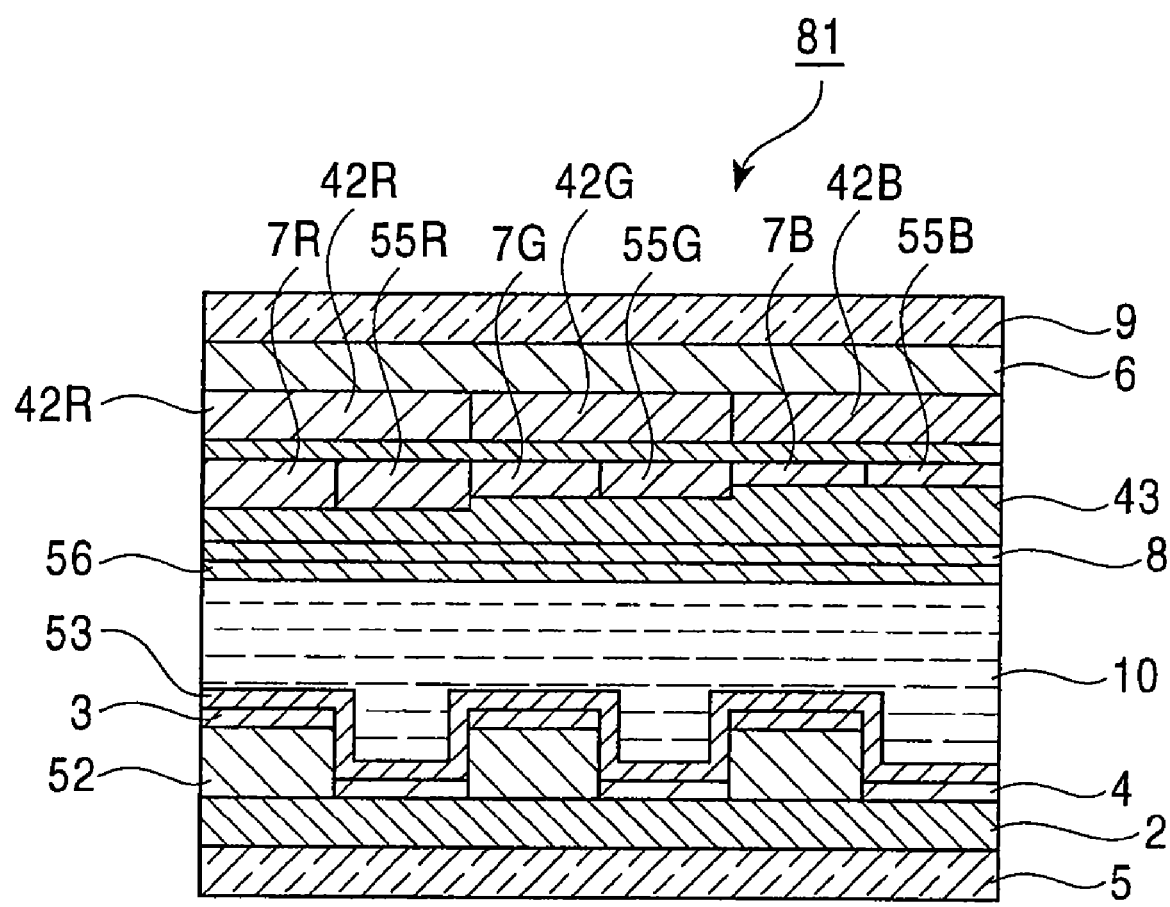
FIG. 17 is a schematic sectional view showing another modification of the liquid crystal display according to the third embodiment.

In addition, according to the present embodiment, the liquid crystal display may also be a full-color liquid crystal display, as shown in FIG. 17.

In a liquid crystal display 81 shown in FIG. 17, color filters 42R, 42G, and 42B corresponding to red, green, and blue dots, respectively, are provided on a substrate 6 on the side facing a liquid crystal layer 10. In addition, a reflective-area λ/4 layer 7R and a transmissive-area λ/4 layer 55R, a reflective-area λ/4 layer 7G and a transmissive-area λ/4 layer 55G, and a reflective-area λ/4 layer 7B and a transmissive-area λ/4 layer 55B, which serve as reflective-area retardation layers, are provided on the color filters 42R, 42G, and 42B, respectively. In addition, a counter electrode 8 is provided on these retardation layers with an overcoat layer 43 therebetween.

The slow axis is different between the reflective area and the transmissive area in each pair of the reflective-area λ/4 layer 7R and the transmissive-area λ/4 layer 55R, the reflective-area λ/4 layer 7G and the transmissive-area λ/4 layer 55G, and the reflective-area λ/4 layer 7B and the transmissive-area λ/4 layer 55B, so that the retardation layers in the transmissive area do not function. Therefore, similar to the above-described liquid crystal displays, it is not necessary to provide additional retardation layers on the back to compensate for the phase difference of the retardation layers used for reflective display and the number of retardation layers can be reduced.

In the liquid crystal display 81 according to this modification, the thicknesses of the reflective-area λ/4 layer 7R and the transmissive-area λ/4 layer 55R, the reflective-area λ/4 layer 7G and the transmissive-area λ/4 layer 55G, and the reflective-area λ/4 layer 7B and the transmissive-area λ/4 layer 55B, which serve as reflective-area retardation layers, are adjusted in accordance with the transmission wavelengths of the color filters 42R, 42G, and 42B, respectively, so that each retardation layer has a phase difference of λ/4. Accordingly, the influence of the chromatic dispersion of each color can be reduced and the image quality can be improved.

The present invention is not limited to the case where the slow axis of the retardation layer in the transmissive area is completely parallel or perpendicular to the transmission axis of the polarizer arranged on the front or back so that the retardation layer in the transmission area does not function at all, and the slow axis of the retardation layer in the transmissive area may also be slightly shifted. For example, the slow axis of the retardation layer in the transmissive area may also have a phase difference which is determined by taking various characteristics of the liquid crystal layer into account. In such a case, preferably, the displacement of the slow axis of the retardation layer in the transmissive area is set such that the phase difference in the transmissive area cancels a residual phase difference in the liquid crystal layer which occurs when sufficient voltage is applied to the liquid crystal layer. Accordingly, compared to the case in which the retardation layer in the transmissive area does not function at all, the darkness in the dark state display can be increased in the transmissive area and the image quality can be improved.

According to the third embodiment, the slow axis of the retardation layer in the transmissive area is parallel to the transmission axis of the polarizer on the front. However, the effects of the present invention may also be obtained when the slow axis of the retardation layer in the transmissive area is parallel to the transmission axis of the polarizer on the back.

Fourth Embodiment

Figure 18A:
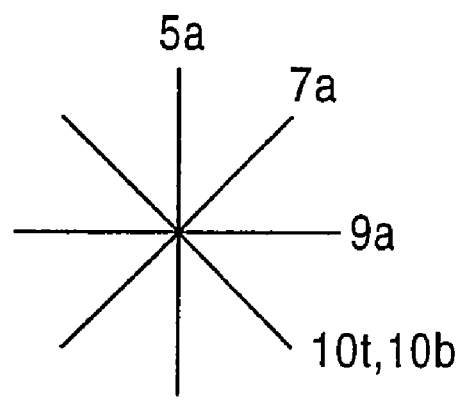
FIGS. 18A to 18C are diagrams showing the basic construction of a liquid crystal display according to a fourth embodiment of the present invention.
Figure 18B:
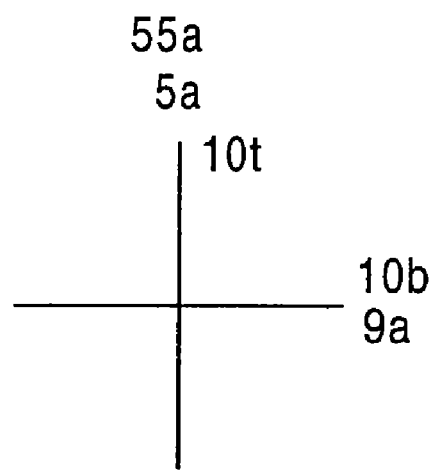
Figure 18C:
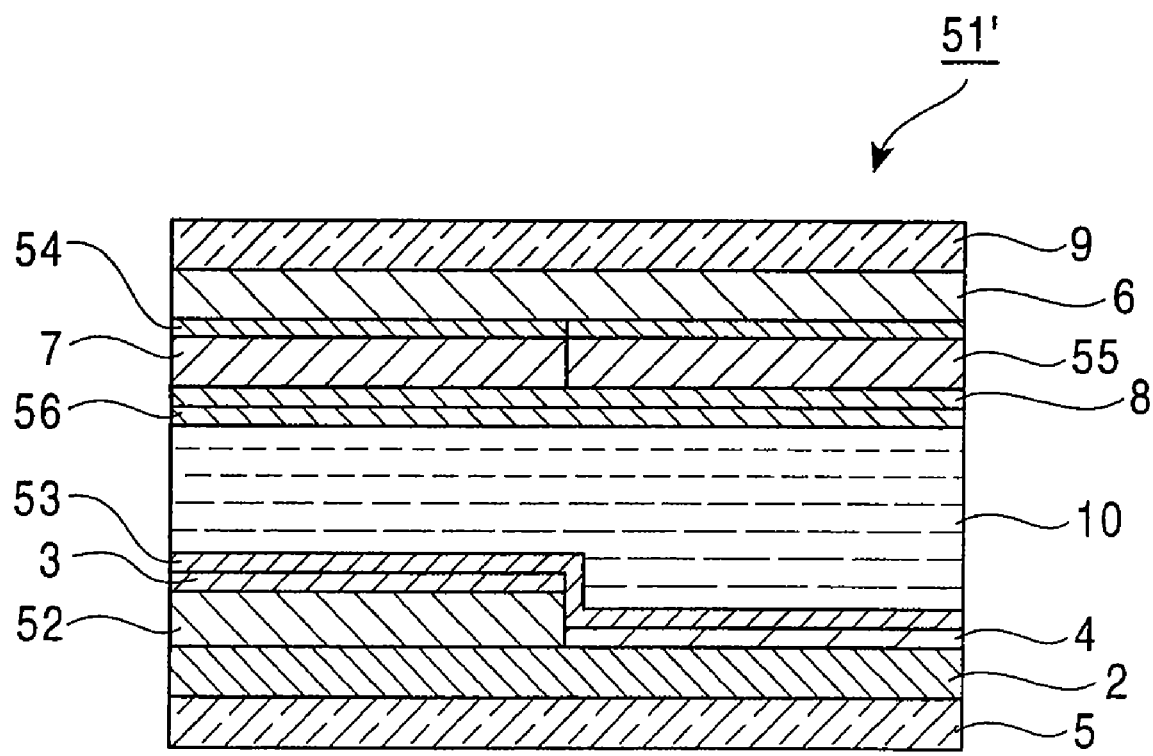

Next, a transflective liquid crystal display according to a fourth embodiment of the present invention will be described below. The liquid crystal display according to the fourth embodiment is obtained by combining the constructions according to the above-described second and third embodiments. The basic construction according to the fourth embodiment will be described below with reference to FIGS. 18A to 18C. FIG. 18C shows a schematic sectional view of the main part of a liquid crystal display 51', and FIGS. 18A and 18B show the optical constructions in a reflective area and a transmissive area, respectively, of the liquid crystal display 51'. In FIGS. 18A to 18C, components similar to those of the liquid crystal display 51 shown in FIG. 12 which is described above in the third embodiment and those of the liquid crystal display 1' shown FIGS. 7A to 7C which is described above in the second embodiment are denoted by the same reference numerals, and explanations thereof are thus omitted.

The liquid crystal display 51' shown in FIGS. 18A to 18C is different from the liquid crystal display shown in FIG. 12 which is described above in the third embodiment in that the orientations of the liquid crystal layer (liquid-crystal orientations) in the reflective area and the transmissive area are adjusted similarly to the second embodiment, and other constructions are similar to those of the third embodiment.

With reference to FIGS. 18A to 18C, in the liquid crystal display 51', the liquid-crystal orientations 10t and 10b in the reflective area is set such that it is parallel to substrates 2 and 6 and are at an angle of 45° with respect to the transmission axes of polarizers 5 and 9 when no voltage is applied to a liquid crystal layer 10'. In addition, the liquid crystal layer 10' is adjusted such that the phase difference is λ/4 in the reflective area when light passes through the liquid crystal layer 10' once while no voltage is applied thereto.

In the transmissive area, the liquid-crystal orientation 10t on the side facing the substrate 6 is parallel to the transmission axis 9a of the polarizer 9 and the liquid-crystal orientation 10b on the side facing the substrate 2 is parallel to the transmission axis 5a of the polarizer 5, so that 90° twisted nematic state where the liquid-crystal molecules are twisted by 90° is obtained, when no voltage is applied to the liquid crystal layer 10'.

When a voltage is applied to the liquid crystal layer 10', the liquid-crystal molecules are aligned approximately perpendicular to the substrates 2 and 6 in both the reflective area and the transmissive area.

In addition, in the liquid crystal display 51', similar to the construction according to the third embodiment which is described above with reference to FIG. 12, an interlayer film 52 is provided in the reflective area and a transmissive-area λ/4 layer 55 is provided on the substrate 6 in the transmissive area.

The thickness of the interlayer film 52 provided in the reflective area is set to adjust the cell gap, that is, the thickness of the liquid crystal layer 10', in the transmissive area and the reflective area. More specifically, the cell gap is set such that the liquid crystal layer 10' has a phase difference of $\lambda/4$ in the reflective area and liquid-crystal molecules in the transmissive area are in a 90° twisted nematic state and satisfy the Mauguin condition so that optical activity is maintained when no voltage is applied to the liquid crystal layer 10'. Therefore, the interlayer film 52 may also be omitted from the liquid crystal display 51' if the above-described conditions can be satisfied without the interlayer film 52.

Similar to the third embodiment, the slow axis of the transmissive-area $\lambda/4$ layer 55 provided on the substrate 6 in the transmissive area is parallel to the transmission axis of the polarizer 9 arranged on the front, so that an effective phase difference does not occur. According to the above-described construction, transmissive display can be achieved without providing an additional retardation layer on the back to compensate for the phase difference of the reflective-area $\lambda/4$ layer 7. The slow axis of the transmissive-area $\lambda/4$ layer 55 in the transmissive area may be parallel to any one of the transmission axis and the absorption axis of the polarizer on the display side and the transmission axis and the absorption axis of the polarizer on the back as long as the retardation layer in the transmissive area does not have an effective phase difference.

Figure 19:
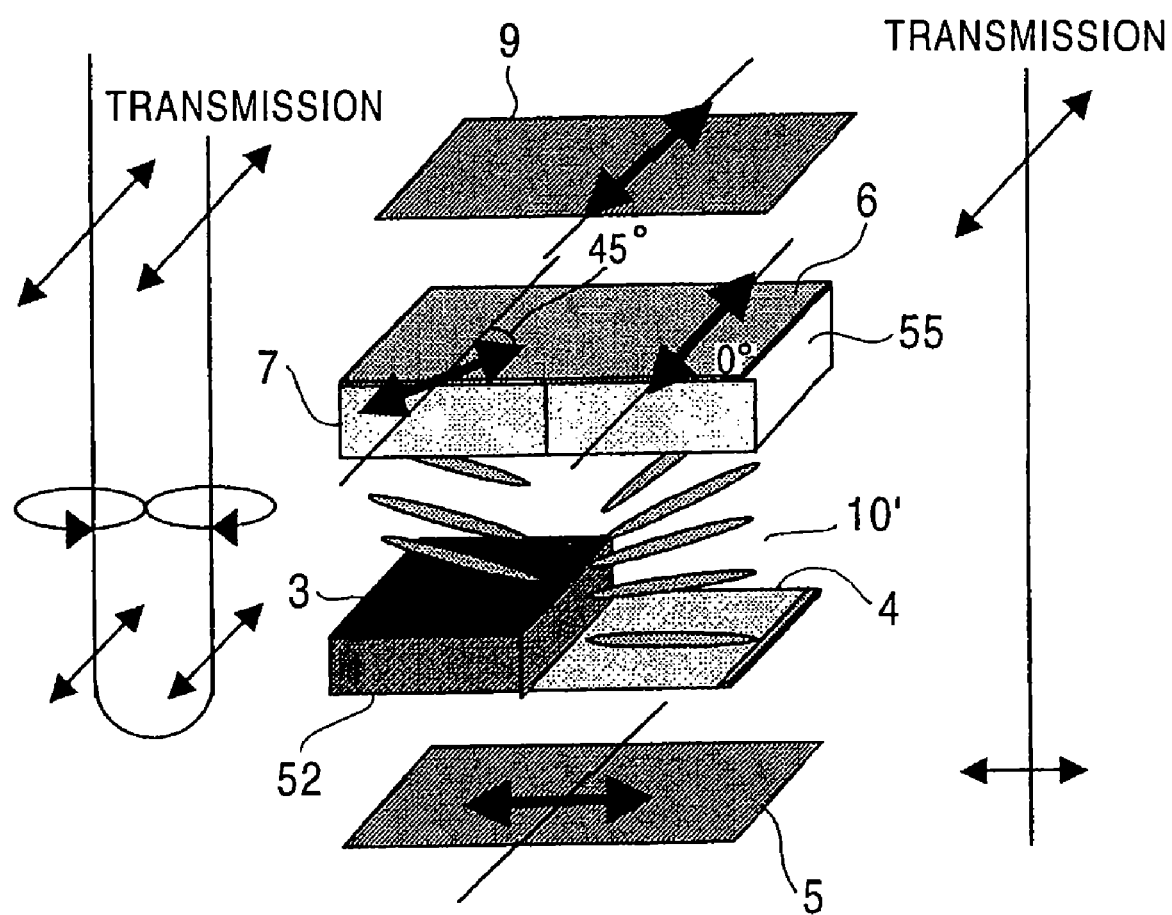
FIG. 19 is an exploded perspective view showing the optical construction of the liquid crystal display shown in FIGS. 18A to 18C when no voltage is applied.
Figure 20:
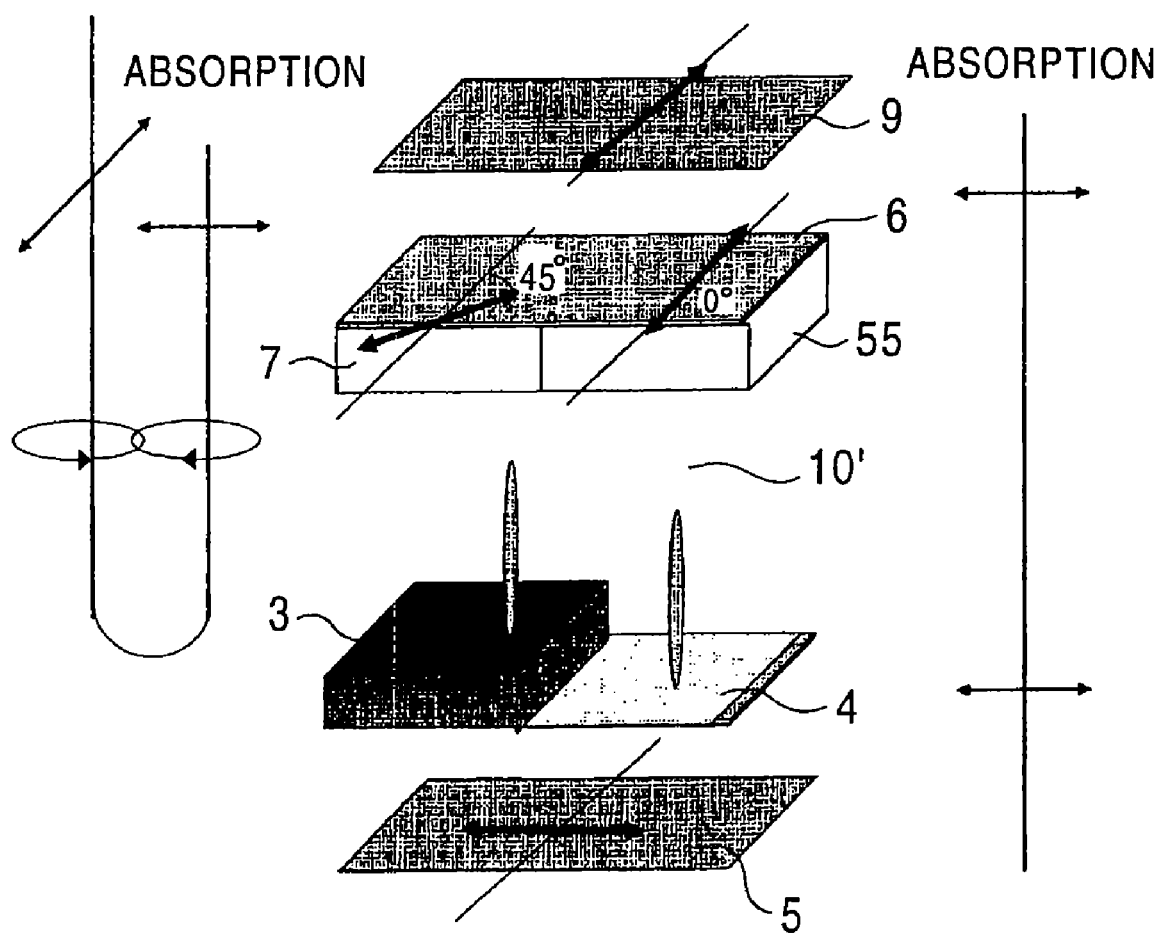
FIG. 20 is an exploded perspective view showing the optical construction of the liquid crystal display shown in FIGS. 18A to 18C when a voltage is applied.

The operation of displaying an image on the liquid crystal display 51' shown in FIGS. 18A to 18C will be described below with reference to FIGS. 19 and 20. For convenience, the substrate 2, a counter electrode 8, and the alignment films are omitted in FIGS. 19 and 20.

A case in which no voltage is applied to the liquid crystal layer 10' and the light state is obtained will be described below with reference to FIG. 19.

In the reflective area, ambient light is incident from the display side and passes through the polarizer 9, where it is linearly polarized in a direction parallel to the transmission axis of the polarizer 9. The linearly polarized light is converted into circularly polarized light as it passes through the reflective-area $\lambda/4$ layer 7, is converted into linearly polarized light by the liquid crystal layer 10', and reaches a reflective electrode 3. The linearly polarized light is reflected by the reflective electrode 3 so that the traveling direction thereof is reversed, and is converted into circularly polarized light as it passes through the liquid crystal layer 10' again. The circularly polarized light passes through the reflective-area $\lambda/4$ layer 7 again, where it is linearly polarized in the direction parallel to the transmission axis of the polarizer 9, and passes through the polarizer 9.

In the transmissive area, light emitted from a backlight is incident from the back and passes through the polarizer 5, where it is linearly polarized in a direction parallel to the transmission axis of the polarizer 5. The linearly polarized light passes through the liquid crystal layer 10' in the 90° twisted nematic state, where it is linearly polarized in a direction perpendicular to the transmission axis of the polarizer 5, that is, in the direction parallel to the transmission axis of the polarizer 9. The linearly polarized light passes through the transmissive-area $\lambda/4$ layer 55 without changing the polarization state thereof, and passes through the polarizer 9.

Next, a case in which a voltage is applied to the liquid crystal layer 10' and the dark state is obtained will be described below with reference to FIG. 20.

In the reflective area, ambient light is incident from the display side and passes through the polarizer 9, where it is linearly polarized in the direction parallel to the transmission axis of the polarizer 9. The linearly polarized light is converted into circularly polarized light as it passes through the reflective-area $\lambda/4$ layer 7. The circularly polarized light passes through the liquid crystal layer 10' and reaches the reflective electrode 3 without changing the polarization state thereof, and is reflected by the reflective electrode 3. When the circularly polarized light is reflected by the reflective electrode 3, the rotating direction thereof is reversed. The thus reflected circularly polarized light passes through the liquid crystal layer 10' again, is incident on the reflective-area $\lambda/4$ layer 7, where it is linearly polarized in a direction perpendicular to the transmission axis of the polarizer 9, and is absorbed by the polarizer 9.

In the transmissive area, light emitted from the backlight is incident from the back and passes through the polarizer 5, where it is linearly polarized in the direction parallel to the transmission axis of the polarizer 5. The linearly polarized light passes through the liquid crystal layer 10' and the transmissive-area $\lambda/4$ layer 55 and reaches the polarizer 9 without changing the polarization state thereof, and is absorbed by the polarizer 9.

In the liquid crystal display 51' which is constructed as described above, similar to the liquid crystal display 51 shown in FIG. 12, the reflective-area $\lambda/4$ layer 7, which is necessary for the dark state display in the reflective area, is provided only in the reflective area, and the transmissive-area $\lambda/4$ layer 55 whose slow axis is parallel to the transmission axis of the polarizer 9 is provided in the transmissive area. Accordingly, effects similar to those of the third embodiment can be obtained. In addition, since the liquid crystal layer is in the 90° twisted nematic state in the transmissive area, images can be displayed in a twisted nematic mode in the transmissive area and the contrast can be increased.

In the above description, the liquid-crystal molecules in the liquid crystal layer are oriented approximately perpendicular to the substrates when a voltage is applied, and the liquid-crystal layer has a phase difference of $\lambda/4$ in the reflective area and is in the 90° twisted nematic state in the transmissive area when no voltage is applied. According to the present invention, however, the construction of the liquid crystal display may also be opposite. More specifically, the liquid crystal layer may also have a phase difference of $\lambda/4$ in the reflective area and be in the 90° twisted nematic state in the transmissive area when a voltage is applied.

Figure 21A:
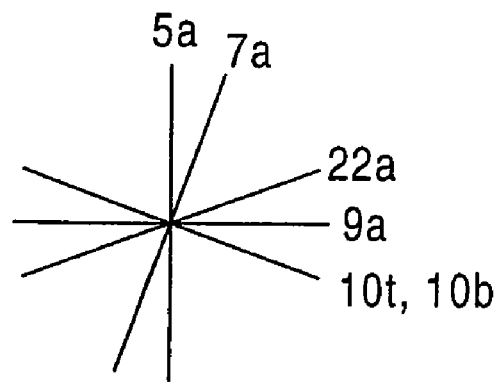
FIGS. 21A to 21C are diagrams showing a modification of the liquid crystal display according to the fourth embodiment.
Figure 21B:
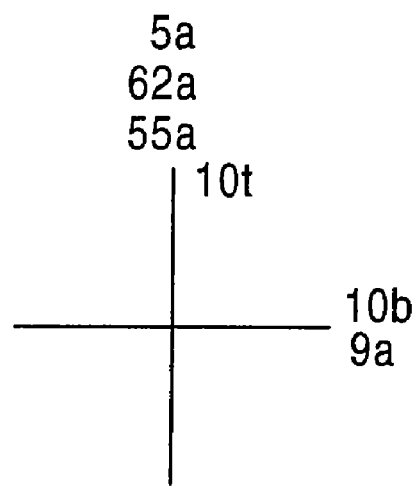
Figure 21C:
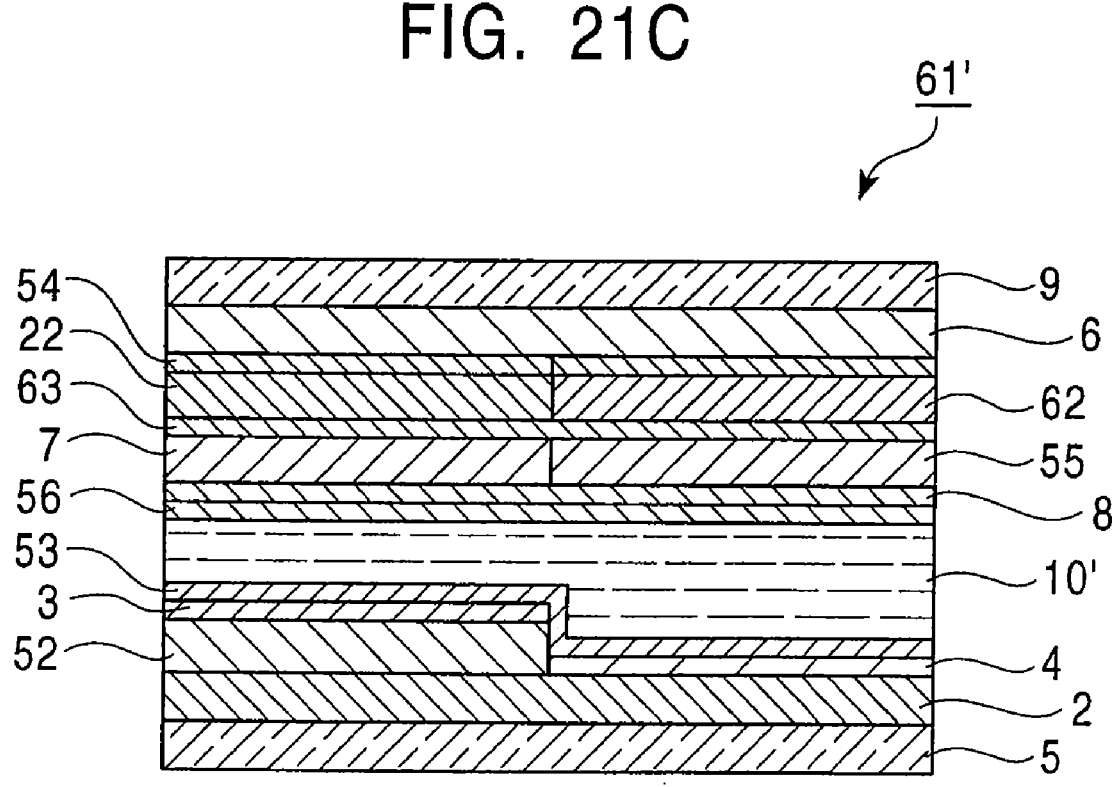

According to the present embodiment, the retardation layers are not limited to those having a single-layer structure consisting of the reflective-area $\lambda/4$ layer 7 and the transmissive-area $\lambda/4$ layer 55, and may also have a two-layer structure, as shown in FIGS. 21A to 21C. In FIGS. 21A to 21C, components similar to those of the liquid crystal display 51' shown in FIGS. 18A to 18C are denoted by the same reference numerals, and explanations thereof are thus omitted.

In a liquid crystal display 61' according to this modification, a reflective-area $\lambda/4$ layer 7 and a transmissive-area $\lambda/4$ layer 55 which serve as retardation layers, a reflective-area $\lambda/2$ layer 22 which compensates for the chromatic dispersion of the reflective-area $\lambda/4$ layer 7, and a transmissive-area $\lambda/2$ layer 62 are provided on a substrate 6 on the side facing a liquid crystal layer 10'. The slow axes of the retardation layers in the transmissive area are different from those of the retardation layers in the reflective area. More specifically, in order for the combination of the reflective-area $\lambda/4$ layer 7 and the reflective-area $\lambda/2$ layer 22 to serve as a $\lambda/4$ layer over a wide wavelength range, the angle between the slow axes 7a and 22a thereof is set to 60° and the slow axes 7a and 22a are at an angle of 15° with respect to the transmission axes 5a and 9a of the polarizers 5 and 9, respectively. In addition, the transmissive-area $\lambda/4$ layer 55 and the transmissive-area $\lambda/2$ layer 62 do not function as retardation layers since the slow axes 55a and 62a thereof are parallel to, for example, the transmission axis 9a of the polarizer 9.

The retardation layers having a two-layer structure can be obtained by processes similar to those described above in the third embodiment.

In this case, the liquid-crystal orientations 10t and 10b in the reflective area are set such that they are parallel to the substrates 2 and 6 and are at an angle of 0° or 90° with respect to the slow axis 7a of the reflective-area λ/4 layer 7 when no voltage is applied to the liquid crystal layer 10'. This setting is for adjusting the residual retardation, and the liquid-crystal orientations 10t and 10b may be in any direction if the residual retardation is negligibly small. In addition, the liquid crystal layer 10' in the reflective area is adjusted such that the phase difference is λ/4 when light passes through the liquid crystal layer 10' once while no voltage is applied thereto. The liquid-crystal orientations 10t and 10b in the transmissive area are the same as those in the liquid crystal display 51' shown in FIGS. 18A to 18C.

As described above, in the liquid crystal display 61', the retardation layers have a two-layer structure and the slow axis of the retardation layer in the reflective area is different from that of the retardation layer in the transmissive area. Accordingly, in addition to the effects obtained by the liquid crystal display 51' having the basic structure, light leakage caused by the chromatic dispersion in the dark state display can be eliminated, particularly in the reflective area, over a wide wavelength range and the image quality can be improved.

The present invention is not limited to liquid crystal displays in which the retardation layers are provided on the substrate 6 arranged on the display side, and may also be applied to liquid crystal displays in which the retardation layers are provided on the substrate 2 adjacent to the backlight, as in the liquid crystal display 71 which is described above with reference to FIG. 16 in the third embodiment. For example, in a liquid crystal display 71' shown in FIG. 22, a reflective electrode 3 and a transparent electrode 4 are provided on a substrate 2 arranged on the back, and a reflective-area λ/4 layer 7 and a transmissive-area λ/4 layer 55 which serve as retardation layers are laminated on the reflective electrode 3 and the transparent electrode 4, respectively, with an alignment film 54 therebetween. The reflective-area λ/4 layer 7 and the transmissive-area λ/4 layer 55 are constructed similarly to those described with reference to FIG. 12.

Similar to the case described above with reference to FIG. 16, a transparent electrode (not shown) for reliably driving the liquid crystal may be disposed between the reflective-area λ/4 layer 7 and an alignment film 53 for driving the liquid crystal and between the transmissive-area λ/4 layer 55 and the alignment film 53.

Although the reflective-area λ/4 layer 7 functions as a retardation layer, the transmissive-area λ/4 layer 55 does not function as a retardation layer since the slow axis thereof is parallel to, for example, the transmission axis of the polarizer 9. When the retardation layers are provided on the substrate adjacent to the backlight, as in the liquid crystal display 71' shown in FIG. 22, sufficient reflectivity can be obtained in the reflective area due to the function of the reflective-area λ/4 layer 7 and transmissive display can be achieved in the transmissive area without providing an additional retardation layer on the display side to compensate for the phase difference of the retardation layer on the back. Accordingly, similar to the above-described liquid crystal displays, high quality, high contrast images can be displayed in both reflective display and transmissive display. In addition, it is not necessary to provide an additional retardation layer on the display side, so that the cell thickness can be reduced and costs can be reduced by the amount corresponding to the omitted retardation layer.

In addition, according to the present embodiment, the liquid crystal display may also be a full-color liquid crystal display, as in the liquid crystal display shown in FIG. 17 which is described above in the third embodiment.

Figure 23:
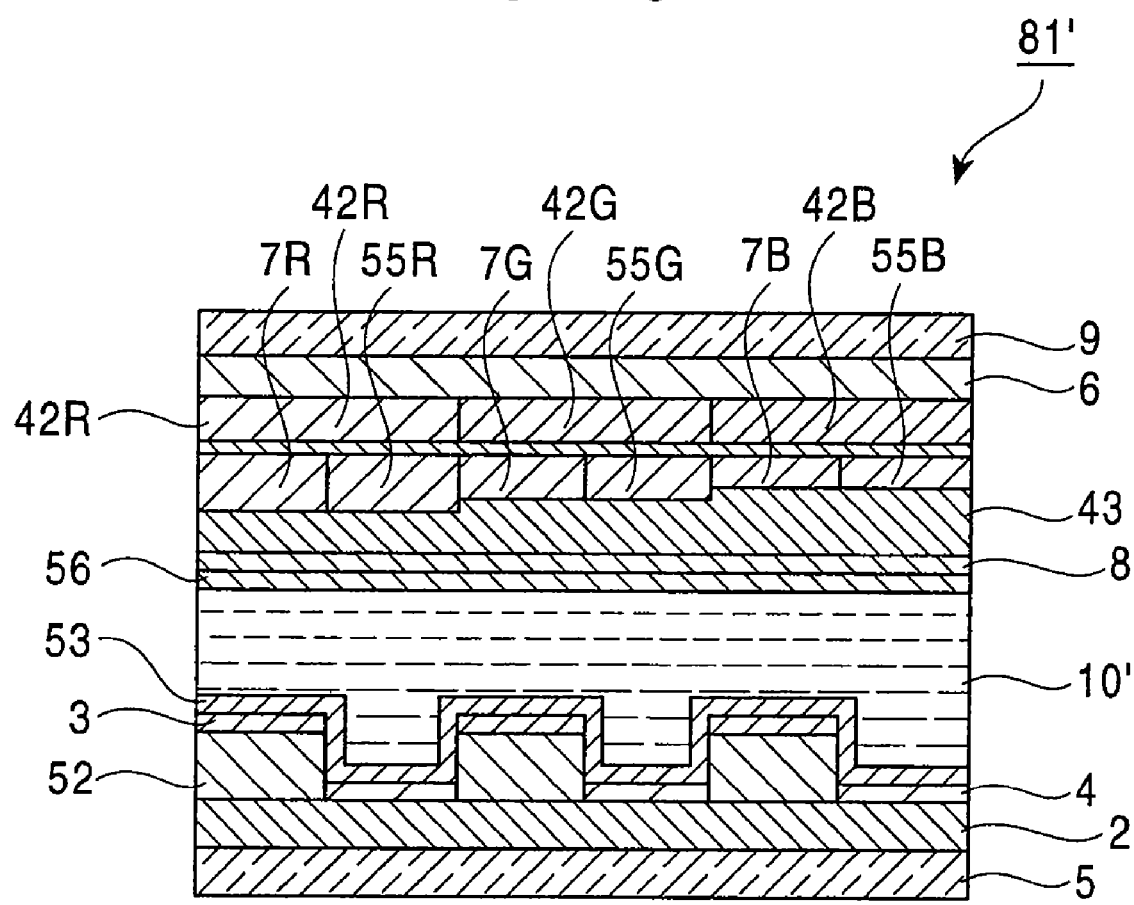
FIG. 23 is a schematic sectional view showing another modification of the liquid crystal display according to the fourth embodiment.

In a liquid crystal display 81' shown in FIG. 23, color filters 42R, 42G, and 42B corresponding to red, green, and blue dots, respectively, are provided on a substrate 6 on the side facing a liquid crystal layer 10'. In addition, a reflective-area λ/4 layer 7R and a transmissive-area λ/4 layer 55R, a reflective-area λ/4 layer 7G and a transmissive-area λ/4 layer 55G, and a reflective-area λ/4 layer 7B and a transmissive-area λ/4 layer 55B, which serve as reflective-area retardation layers, are provided on the color filters 42R, 42G, and 42B, respectively. In addition, a counter electrode 8 is provided on these retardation layers with an overcoat layer 43 therebetween.

The slow axis is different between the reflective area and the transmissive area in each pair of the reflective-area λ/4 layer 7R and the transmissive-area λ/4 layer 55R, the reflective-area λ/4 layer 7G and the transmissive-area λ/4 layer 55G, and the reflective-area λ/4 layer 7B and the transmissive-area λ/4 layer 55B, so that the retardation layers in the transmissive area do not function. Therefore, similar to the above-described liquid crystal displays, it is not necessary to provide additional retardation layers on the back to compensate for the phase difference of the retardation layers used for reflective display and the number of retardation layers can be reduced.

In the liquid crystal display 81' according to this modification, the thicknesses of the reflective-area λ/4 layer 7R and the transmissive-area λ/4 layer 55R, the reflective-area λ/4 layer 7G and the transmissive-area λ/4 layer 55G, and the reflective-area λ/4 layer 7B and the transmissive-area λ/4 layer 55B, which serve as reflective-area retardation layers, are adjusted in accordance with the transmission wavelengths of the color filters 42R, 42G, and 42B, respectively, so that each retardation layer has a phase difference of λ/4. Accordingly, the influence of chromatic dispersion of each color can be reduced and the image quality can be improved.

Figure 24A:
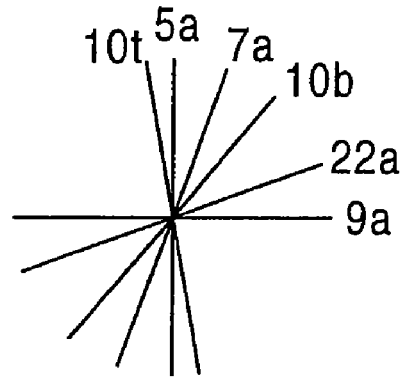
FIGS. 24A to 24C are diagrams showing another modification of the liquid crystal display according to the fourth embodiment.
Figure 24B:
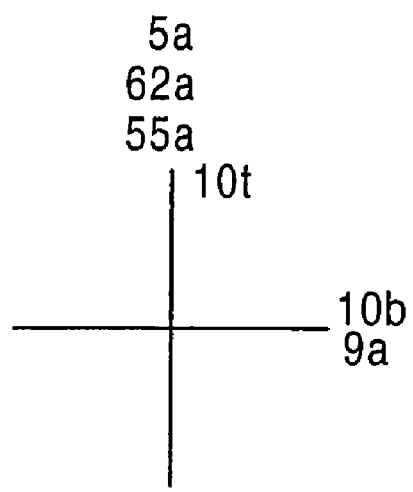
Figure 24C:
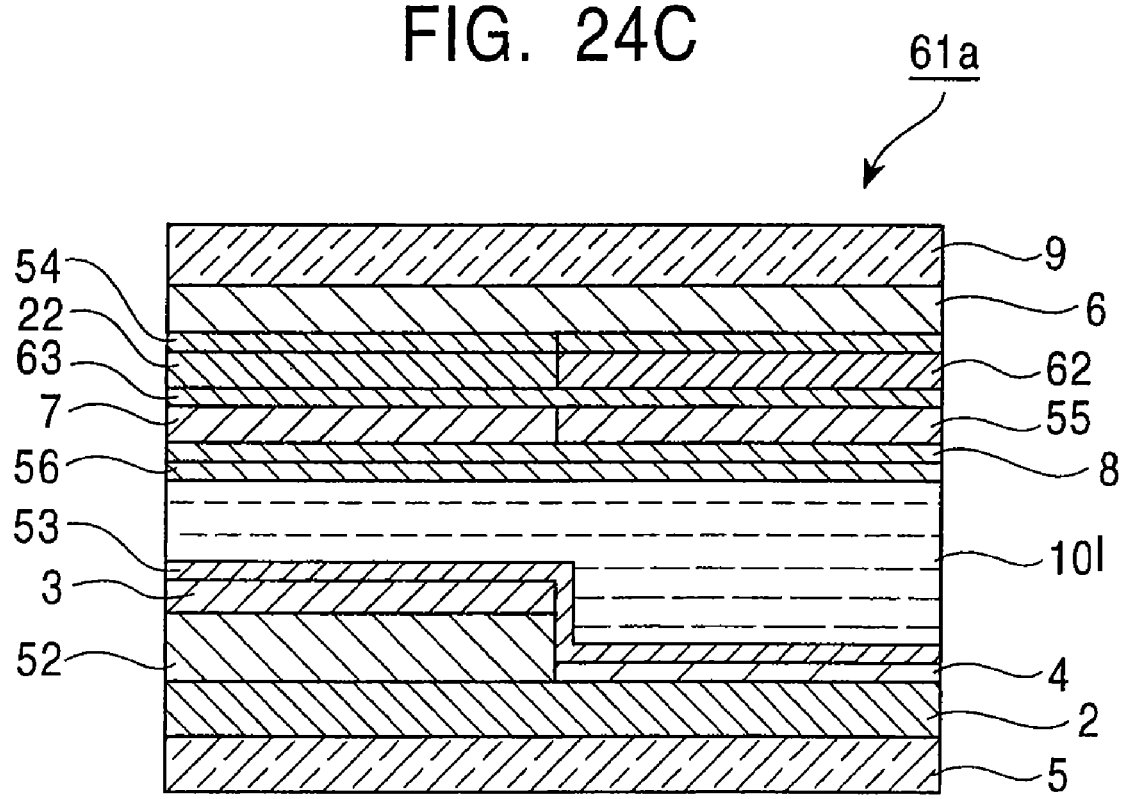

In the fourth embodiment, not only the liquid crystal layer 10' in the transmissive area but also the liquid crystal layer 10' in the reflective area may be in the twisted nematic state. The case in which the liquid crystal layer 10' in the transmissive area is also in the twisted nematic state will be described below with reference to FIGS. 24A to 24C. In FIGS. 24A to 24C, components similar to those of the liquid crystal display 61' shown in FIGS. 21A to 21C are denoted by the same reference numerals, and explanations thereof are thus omitted.

A liquid crystal display 61a according to this modification is similar to the liquid crystal display 61' described above with reference to FIGS. 21A to 21C except for the liquid-crystal orientations in the reflective area.

More specifically, in the liquid crystal display 61 a shown in FIGS. 24A to 24C, the liquid-crystal orientations 10t and 10b in the reflective area is set such that a liquid crystal layer 10' is in a twisted-nematic state when no voltage is applied thereto. Accordingly, in the liquid crystal display 61a, an angle between the alignment directions of alignment films (not shown) disposed between substrates 2 and 6 so as to face the liquid crystal layer 10' is set to a predetermined angle. This angle is determined in accordance with the cell gap and the birefringence of the liquid crystal layer 10' such that the phase difference of the liquid crystal layer 10' is λ/4 when light passes through the liquid crystal layer 10' once while no voltage is applied thereto.

Figure 25A:
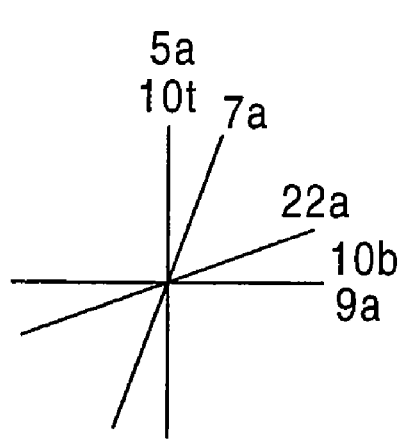
FIGS. 25A to 25C are diagrams showing another modification of the liquid crystal display according to the fourth embodiment.
Figure 25B:
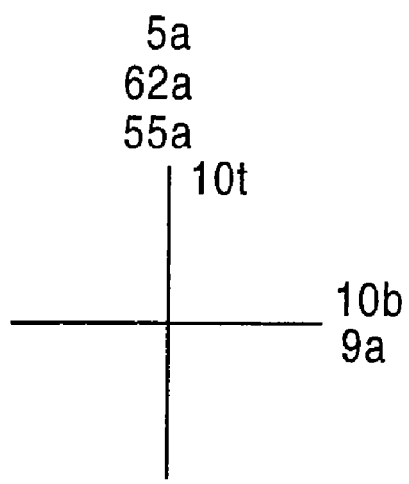
Figure 25C:
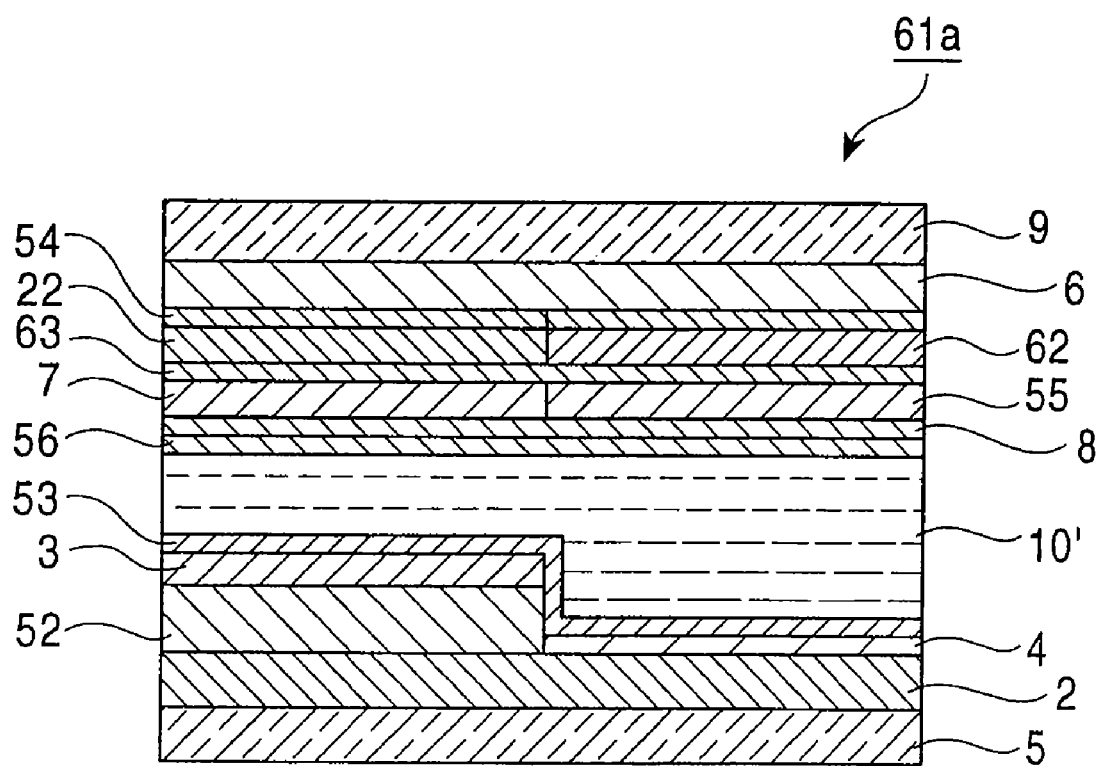

Accordingly, as shown in FIGS. 25A to 25C, the liquid-crystal orientation 10*b* on the side facing the substrate 2 may be at an angle of 90° with respect to the liquid-crystal orientation 10*t* on the side facing the substrate 6. In such a case, the alignment films which face the liquid crystal layer 10' may have the same alignment direction in the reflective area and the transmissive area, so that the process of multi-domain alignment can be omitted.

In the liquid crystal display 61a shown in FIGS. 24A to 24C and FIGS. 25A to 25C, when a voltage is applied to the liquid crystal layer 10', the liquid-crystal molecules are aligned approximately perpendicular to the substrates 2 and 6, similar to the above-described cases.

When the liquid-crystal layer in the reflective area is in the twisted nematic state as described above, effective phase difference of the liquid crystal layer in the reflective area decreases. Therefore, the cell gap for obtaining a phase difference of λ/4 in the reflective area increases and the allowance for the cell gap increases accordingly. As a result, the yield of the liquid crystal display can be increased.

The fourth embodiment of the present invention is not limited to the case where the slow axis of the retardation layer in the transmissive area is completely parallel or perpendicular to the transmission axis of the polarizer arranged on the front or back so that the retardation layer in the transmission area does not function at all, and the slow axis of the retardation layer in the transmissive area may also be slightly shifted. For example, the slow axis of the retardation layer in the transmissive area may also have a phase difference which is determined by taking various characteristics of the liquid crystal layer into account. In such a case, preferably, the displacement of the slow axis of the retardation layer in the transmissive area is set such that the phase difference in the transmissive area cancels a residual phase difference in the liquid crystal layer which occurs when sufficient voltage is applied to the liquid crystal layer. Accordingly, compared to the case in which the retardation layer in the transmissive area does not function at all, the darkness in the dark state display can be increased in the transmissive area and the image quality can be improved.

According to the fourth embodiment, the slow axis of the retardation layer in the transmissive area is parallel to the transmission axis of the polarizer on the front. However, the effects of the present invention may also be obtained when the slow axis of the retardation layer in the transmissive area is parallel to the transmission axis of the polarizer on the back.

The constructions described above in the fourth embodiment may also be used in combination with each other, and effects specific to the combined construction can be obtained in such a case.

EXAMPLES

Examples in which the present invention is applied will be described below in conjunction with experiment results. Examples 1 to 5 correspond to the first embodiment, Examples 6 to 8 correspond to the second embodiment, Examples 9 to 13 correspond to the third embodiment, and Examples 14 to 19 correspond to the fourth embodiment.

Example 1

In Example 1, a full-color liquid crystal panel whose optical construction was the same as that of the liquid crystal display 1 shown in FIG. 1 was manufactured.

First, a substrate to be arranged on the back having thin film transistors (TFTs) for active-matrix driving of a liquid crystal layer was manufactured. A method for forming the TFTs will be described below with reference to FIG. 26.

A borosilicate glass (Corning 7059 produced by Corning Incorporated) was used as a substrate 2. First, a gate electrode 91 composed of Mo, MoW, etc., a gate insulator 92, and amorphous silicon were successively deposited on the substrate 2 and patterned, and the amorphous silicon was crystallized by annealing it with an excimer laser so as to form a semiconductor thin film 93. Then, P and B were doped into the semiconductor thin film 93 on both sides of the gate electrode 91, so that n-channel and p-channel TFTs were obtained. Then, a first interlayer insulator 94 composed of $SiO_2$ was formed on the substrate 2 so as to cover the TFTs.

Then, holes were formed in the first interlayer insulator 94 by, for example, etching, at positions corresponding to a source and a drain of the semiconductor thin film 93, and signal lines 95 composed of Al were formed in a predetermined shape by patterning.

Figure 26:
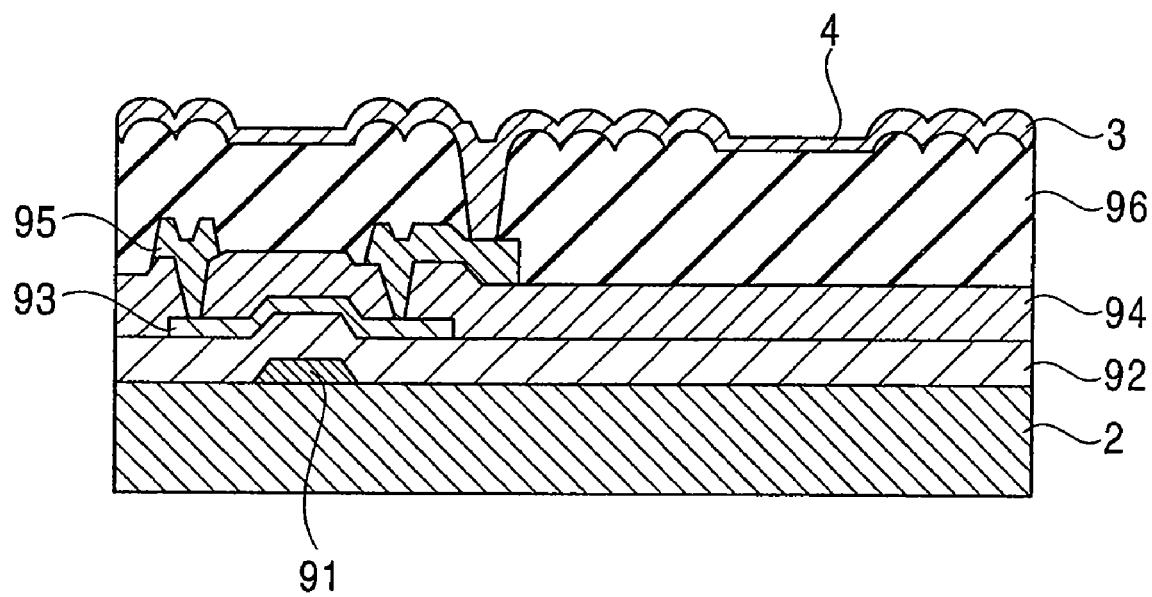
FIG. 26 is a sectional view of a substrate arranged on the back which is provided with TFTs.
Figure 27:
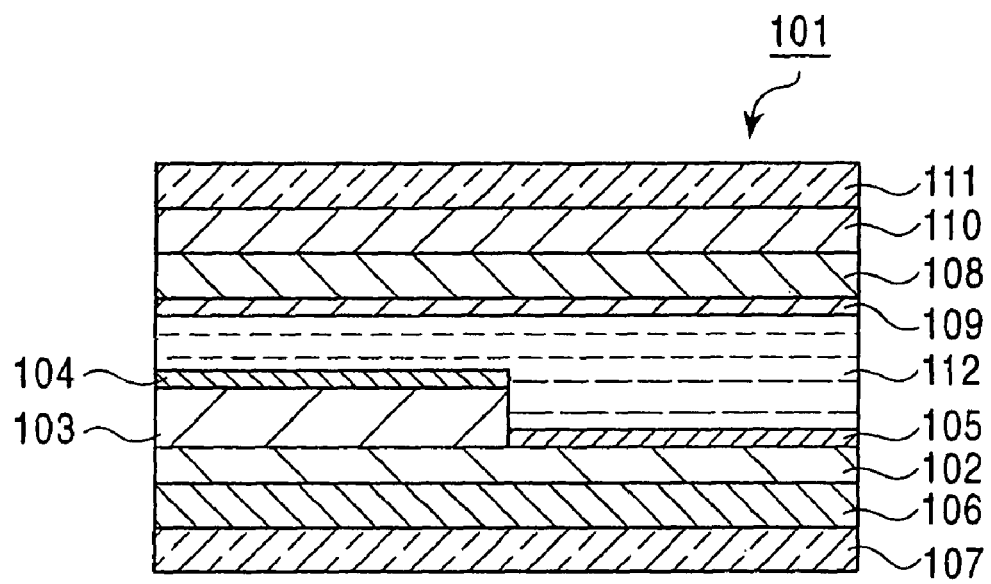
FIG. 27 is a schematic sectional view of a known transflective liquid crystal display having two retardation layers.
Figure 28:
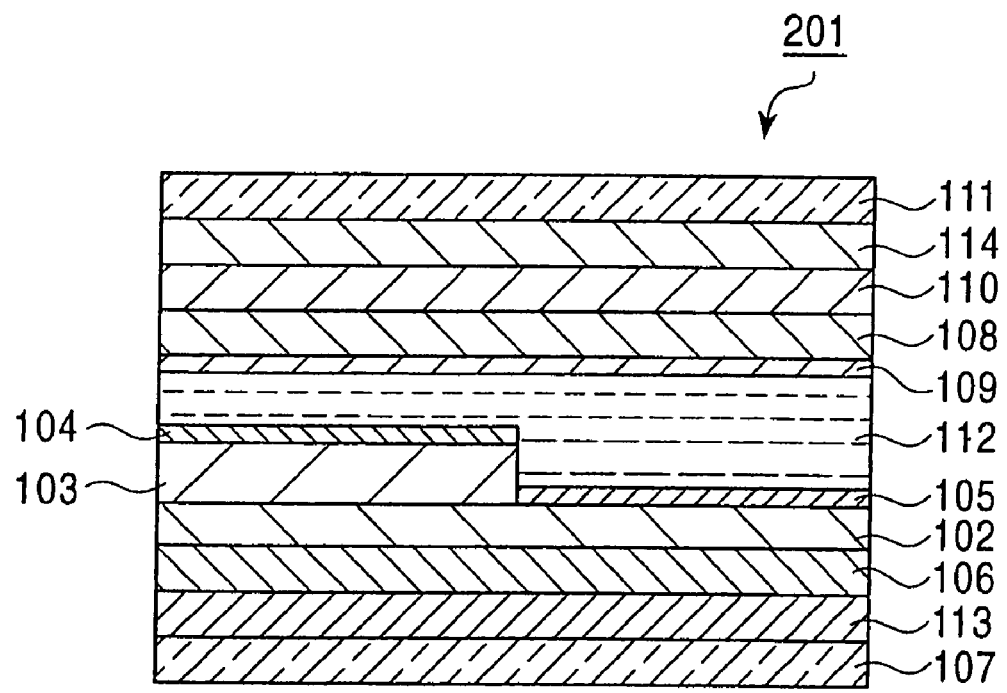
FIG. 28 is a schematic sectional view of a known transflective liquid crystal display having four retardation layers.

Next, a second interlayer insulator 96 having both a function as a scattering layer for causing scattered reflection and a function as an interlayer insulator was formed on the substrate 2 so as to cover the TFTs and the signal lines 95. Then, a transparent electrode 4 composed of indium tin oxide (ITO) was formed on the second interlayer insulator 96 at regions corresponding to the transmissive area and a reflective electrode 3 composed of Ag was formed on the second interlayer insulator 96 at regions corresponding to the reflective area. Accordingly, the substrate to be arranged on the side adjacent to the backlight was manufactured as shown in FIG. 26.

Then, a black matrix composed of Cr was formed on a counter substrate, and red, green, and blue (RGB) filters were formed on the counter substrate in a predetermined pattern. Then, an alignment film was formed on the color filters by applying polyimide to the color filters by printing and rubbing it.

Then, an ultraviolet-curable liquid crystal monomer (RMM 34 produced by Merck Ltd.) was spin-coated on the alignment film and was subjected to an exposure process and a development process, so that a reflective-area λ/4 layer which served as a retardation layer was formed only in the reflective area and no retardation layer was formed in the transmissive area. Since this ultraviolet-curable liquid crystal monomer cannot be sufficiently polymerized when oxygen exists, the above-described processes were performed in $N_2$ atmosphere. In addition, since the birefringence Δn of RMM 34 is 0.145, the thickness of the retardation layer formed by spin coating was set to 950 nm. Accordingly, the retardation was within the range of 135 nm to 140 nm. After the retardation layer was formed, a counter electrode was formed by sputtering ITO.

Then, normal cell processes were performed. More specifically, an alignment film was formed on the counter electrode by applying polyimide to the counter electrode by printing and rubbing it.

The rubbing direction of the alignment film adjacent to the retardation layer was the same as the orientation of the liquid-crystal polymer on the side facing the retardation layer. In addition, the rubbing direction of the alignment film on the substrate having the TFTs was set antiparallel to the rubbing direction of the alignment film adjacent to the retardation layer.

The substrate having the TFTs and the counter substrate having the retardation layer were assembled together by normal processes, and a liquid crystal panel whose optical construction was the same as that of the liquid crystal display shown in FIG. 1 and which was provided with the color filters was thus obtained. Then, it was experimentally confirmed that high-contrast images could be displayed by using this panel.

Example 2

In Example 2, a full-color liquid crystal panel whose optical construction was the same as that of the liquid crystal display 21 shown in FIG. 4 was manufactured.

First, a substrate having TFTs similar to that shown in FIG. 26 was formed by processes similar to those of Example 1.

Then, color filters were formed on a counter substrate by processes similar to those of Example 1, and an alignment film was formed on the color filters by applying polyimide to the color filters by printing and rubbing it.

Then, an ultraviolet-curable liquid crystal monomer was applied to the alignment film such that the $\lambda/2$ condition was satisfied, and was patterned such that a retardation layer was formed only in the reflective area. Accordingly, a reflective-area $\lambda/2$ layer which served as a retardation layer was formed.

Next, polyimide was applied by printing and was rubbed in a direction at an angle of 60° with respect to the rubbing direction of the above-described alignment film. Then, an ultraviolet-curable liquid crystal monomer was applied such that the $\lambda/4$ condition was satisfied, and was patterned such that a retardation layer was formed only in the reflective area. Accordingly, a reflective-area $\lambda/4$ layer which served as a retardation layer was formed. After the retardation layer having a two-layer structure consisting of the reflective-area $\lambda/2$ layer and the reflective-area $\lambda/4$ layer was formed, a counter electrode was formed by sputtering ITO.

Then, normal cell processes were performed. More specifically, an alignment film was formed on the counter electrode by applying polyimide to the counter electrode by printing and rubbing it. The rubbing process was performed such that the orientation of the liquid-crystal layer is between $\lambda/2$ and $\lambda/4$.

The substrate having the TFTs and the counter substrate having the retardation layer were assembled together by normal processes, and a liquid crystal panel whose optical construction was the same as that of the liquid crystal display shown in FIG. 4 and which was provided with the color filters was thus obtained. Then, it was experimentally confirmed that high-contrast images could be displayed by using this panel.

Example 3

In Example 3, a full-color liquid crystal panel whose optical construction was the same as that of the liquid crystal display 31 shown in FIG. 5 was manufactured.

First, a substrate having TFTs similar to that shown in FIG. 26 was formed by processes similar to those of Example 1.

Then, color filters were formed on a counter substrate by processes similar to those of Example 1, and an alignment film was formed on the color filters by applying polyimide to the color filters by printing and rubbing it.

Next, a retardation layer consisting of a reflective-area $\lambda/2$ layer and a reflective-area $\lambda/4$ layer was formed only in the reflective area by processes similar to those of Example 2.

Next, polyimide was applied by printing and was rubbed in a direction at an angle of 90° with respect to the center line between the slow axes of the reflective-area $\lambda/2$ layer and the reflective-area $\lambda/4$ layer. Then, a transmissive-area retardation layer for canceling a residual phase difference which occurred when a voltage was applied to the liquid crystal layer was formed only in the transmissive area. The transmissive-area retardation layer had a phase difference of 30 nm, which was the same as the residual phase difference which occurred when a voltage was applied to the liquid crystal layer.

After the retardation layer in the reflective area and the transmissive-area retardation layer were formed, a counter electrode was formed by sputtering ITO.

Then, normal cell processes were performed. More specifically, an alignment film was formed on the counter electrode by applying polyimide to the counter electrode by printing and rubbing it.

The substrate having the TFTs and the counter substrate having the retardation layer were assembled together by normal processes, and a liquid crystal panel whose optical construction was the same as that of the liquid crystal display shown in FIG. 5 and which was provided with the color filters was thus obtained. Then, it was experimentally confirmed that the dark state display in transmissive display could be improved compared to the liquid crystal panel of Example 1 and high-contrast images could be displayed by using this panel.

Example 4

In Example 4, a full-color liquid crystal panel whose optical construction was the same as that of the liquid crystal display 41 shown in FIG. 6 was manufactured.

First, a substrate having TFTs similar to that shown in FIG. 26 was formed by processes similar to those of Example 1.

Then, color filters were formed on a counter substrate by processes similar to those of Example 1, and an alignment film was formed on the color filters by applying polyimide to the color filters by printing and rubbing it.

Then, an ultraviolet-curable liquid crystal monomer was spin-coated on the alignment film and was subjected to an exposure process and a development process, so that reflective-area $\lambda/4$ layers which served as retardation layers were formed only in the reflective area and no retardation layer was formed in the transmissive area.

The thickness of each retardation layer was set in accordance with a phase difference of its corresponding pixel. More specifically, the thickness of the retardation layer for a green pixel was set to 950 nm as in Example 1. In addition, the thickness of the retardation layer for a blue pixel was set to 730 nm since the birefringence $\Delta n$ was about 0.155 according to the retardation at the blue pixel, and the thickness of the retardation layer for a red pixel was set to 1200 nm since the birefringence $\Delta n$ was about 0.135 according to the retardation at the red pixel.

After the retardation layers were formed, a counter electrode was formed by sputtering ITO.

Then, normal cell processes were performed. More specifically, an alignment film was formed on the counter electrode by applying polyimide to the counter electrode by printing and rubbing it.

The substrate having the TFTs and the counter substrate having the retardation layers were assembled together by normal processes, and a liquid crystal panel whose optical construction was the same as that of the liquid crystal display shown in FIG. 6 and which was provided with the color filters was thus obtained. Then, it was experimentally confirmed that the dark state display could be improved compared to the liquid crystal panel of Example 1 and high-contrast images could be displayed by using this panel.

Example 5

In Example 5, a liquid crystal panel was manufactured in which a retardation layer was formed on a substrate having TFTs arranged adjacent to a backlight in a reflective area thereof.

First, a substrate having TFTs similar to that shown in FIGS. 26 was formed by processes similar to those of Example 1. Then, a reflective-area λ/4 layer which served as a retardation layer was formed on a reflective electrode provided on this substrate, and an ITO electrode was formed on the reflective-area λ/4 layer by sputtering.

In addition, a counter electrode was formed on a counter substrate by sputtering ITO, and no retardation layer was formed on this substrate. Then, an alignment film was formed on the counter electrode by applying polyimide to the counter electrode by printing and rubbing it.

The substrate having the TFTs and the retardation layer and the counter substrate having the counter electrode were assembled together by normal processes, and a liquid crystal panel was thus obtained. Then, it was experimentally confirmed that, similar to Example 1, high-contrast images could be displayed in transmissive display by using this panel.

Example 6

In Example 6, a full-color liquid crystal panel whose optical construction was the same as that of the liquid crystal display 1' shown in FIGS. 7A to 7C was manufactured.

First, a substrate having TFTs (TFT substrate) similar to that shown in FIGS. 26 was formed by processes similar to those of Example 1. Then, an alignment film was formed by applying polyimide to a reflective electrode 3 and a transparent electrode 4 provided on the TFT substrate and subjecting it to mask rubbing. In the mask rubbing process, the rubbing direction was at an angle of 45° with respect to the transmission axis of a polarizer 5 to be arranged on the outer side of the TFT substrate in the reflective area and was parallel to the transmission axis of the polarizer 5 in the transmissive area.

Then, a reflective-area λ/4 layer 7 and a counter electrode 8 were formed on a substrate to face the TFT substrate (counter substrate) by processes similar to those of Example 1. An alignment film provided under the reflective-area λ/4 layer 7 was rubbed in a direction such that the slow axis of the reflective-area λ/4 layer 7 was at an angle of 45° with respect to the transmission axis of a polarizer 9 to be arranged on the outer side of the counter substrate.

Then, an alignment film was formed on the counter electrode 8 by applying polyimide on the counter electrode 8 and subjecting it to mask rubbing. In the mask rubbing process, the rubbing direction was at an angle of 90° with respect to the slow axis of the reflective-area λ/4 layer 7 in the reflective area and was parallel to the transmission axis of the polarizer 9 in the transmissive area.

The TFT substrate having the alignment film on the display side thereof and the counter substrate were assembled together by normal processes. The TFT substrate and the counter substrate were laminated to each other such that the alignment direction of the alignment film on the TFT substrate and that of the alignment film on the counter substrate were antiparallel to each other in the reflective area and were twisted by 90° in the transmissive area. Then, a liquid-crystal material whose birefringence Δn was 0.09 was injected and sealed between the substrates, so that a liquid crystal layer 10' having a phase difference of λ/4 in the reflective area was obtained. Then, the polarizer 5 was adhered to the TFT substrate such that the transmission axis thereof was parallel to the rubbing direction of the alignment film provided on the TFT substrate in the transmissive area. In addition, the polarizer 9 was adhered to the counter substrate such that the transmission axis thereof was parallel to the rubbing direction of the alignment film on the counter substrate in the transmissive area.

Accordingly, a liquid crystal panel whose optical construction was the same as that of the liquid crystal display 1' shown in FIGS. 7A to 7C and which was provided with color filters was thus obtained. Then, it was experimentally confirmed that the dark state display in transmissive display could be improved compared to the liquid crystal panel of Example 1 and high-contrast images could be displayed by using this panel.

Example 7

In Example 7, a full-color liquid crystal panel whose optical construction was the same as that of the liquid crystal display 21' shown in FIGS. 10A to 10C was manufactured.

First, a TFT substrate similar to that shown in FIG. 26 was formed by processes similar to those of Example 6, and an alignment film was formed on a reflective electrode 3 and a transparent electrode 4 provided on the TFT substrate. The rubbing direction of the alignment film was at an angle of 75° with respect to the transmission axis of a polarizer 5 to be arranged on the outer side of the TFT substrate in the reflective area and was parallel to the transmission axis of the polarizer 5 in the transmissive area.

Then, a reflective-area λ/2 layer 22 and a reflective-area λ/4 layer 7 were formed on a substrate to face the TFT substrate (counter substrate), and a counter electrode 8 and an alignment film were formed thereon by processes similar to those of Example 2. An alignment film provided under the reflective-area λ/4 layer 22 was rubbed in a direction such that the slow axis of the reflective-area λ/2 layer 22 was at an angle of 15° with respect to the transmission axis of a polarizer 9 to be arranged on the outer side of the counter substrate, and an alignment film provided under the reflective-area λ/4 layer 7 was rubbed in a direction such that the slow axis of the reflective-area λ/4 layer 7 was at an angle of 60° with respect to the slow axis of the reflective-area λ/2 layer 22 and 75° with respect to the transmission axis of the polarizer 9. In addition, the alignment film on the counter electrode 8 was rubbed in a direction at an angle of 90° with respect to the slow axis of the reflective-area λ/4 layer 7 and 15° with respect to the transmission axis of the polarizer 9 in the reflective area, and in a direction parallel to the transmission axis of the polarizer 9 in the transmissive area.

The TFT substrate having the alignment film on the display side thereof and the counter substrate were assembled together by processes similar to those of Example 6, and a liquid crystal panel whose optical construction was the same as that of the liquid crystal display 21' shown in FIGS. 10A to 10C and which was provided with color filters was thus obtained. Then, it was experimentally confirmed that the dark state display in transmissive display could be further improved compared to the liquid crystal panel of Example 6 and high-contrast images could be displayed by using this panel.

Example 8

In Example 8, a full-color liquid crystal panel whose optical construction was the same as that of the liquid crystal display 21a shown in FIGS. 11A to 11C was manufactured.

First, a TFT substrate similar to that shown in FIG. 26 was formed by processes similar to those of Example 6, and an alignment film was formed on a reflective electrode 3 and a transparent electrode 4 provided on the TFT substrate. The rubbing direction of the alignment film was at an angle of 52.5° with respect to the transmission axis of a polarizer 5 to be arranged on the outer side of the TFT substrate in the reflective area.

Then, a reflective-area $\lambda/2$ layer 22 and a reflective-area $\lambda/4$ layer 7 were formed on a substrate to face the TFT substrate (counter substrate), and a counter electrode 8 and an alignment film were formed thereon by processes similar to those of Example 7. The alignment film was rubbed in a direction at an angle of 96.5° with respect to the slow axis of the reflective-area $\lambda/4$ layer 7 and 7.5° with respect to the transmission axis of a polarizer 9 in the reflective area.

The TFT substrate having the alignment film on the display side thereof and the counter substrate were assembled together by normal processes. The TFT substrate and the counter substrate were laminated to each other such that the angle between the alignment direction of the alignment film on the TFT substrate and that of the alignment film on the counter substrate was 45° in the reflective area and 90° in the transmissive area and the cell gap was 2.7 µm in the reflective area and 4.8 µm in the transmissive area. Then, a liquid-crystal material whose birefringence $\Delta n$ was 0.1 was injected and sealed between the substrates, so that a liquid crystal layer 10' having a phase difference of $\lambda/4$ in the reflective area was obtained. Then, the polarizer 5 and the polarizer 9 were adhered in a manner similar to Example 6. A residual phase difference occurred when a voltage was applied was adjusted by the $\lambda/4$ layer.

Accordingly, a liquid crystal panel whose optical construction was the same as that of the liquid crystal display 21a shown in FIGS. 11A to 11C and which was provided with color filters was thus obtained. Then, it was experimentally confirmed that the dark state display could be further improved compared to the liquid crystal panel of Example 6 and high-contrast images could be displayed by using this panel. In addition, since the allowance for the cell gap was increased compared to that in Example 7, the yield of the liquid crystal panel was increased.

Example 9

In Example 9, a full-color liquid crystal panel whose optical construction was the same as that of the liquid crystal display 51 shown in FIG. 12 was manufactured.

First, a substrate having TFTs similar to that shown in FIGS. 26 was formed by processes similar to those of Example 1.

Then, a black matrix composed of Cr was formed on a counter substrate, and red, green, and blue (RGB) filters were formed on the counter substrate in a predetermined pattern. Then, an alignment film was formed on the color filters by applying polyimide to the color filters by printing and rubbing it.

In the rubbing process, mask rubbing was performed in which the alignment film was first rubbed in a predetermined direction while one of a reflective area and a transmissive area was masked with resist using photolithography techniques, and then rubbed in another direction while the other area was masked with resist. The rubbing direction in the reflective area was at an angle of 45° with respect to the transmission axis of a polarizer to be arranged on the front, and that in the transmissive area was parallel to the transmission axis of the polarizer on the front.

Then, an ultraviolet-curable liquid crystal monomer (RMM 34 produced by Merck Ltd.) was spin-coated on the alignment film and was subjected to an exposure process, so that a $\lambda/4$ layer which served as a retardation layer was formed. The liquid-crystal polymer was aligned along the rubbing direction of the alignment film provided under it. Accordingly, although the retardation layer functioned as a $\lambda/4$ layer in the reflective area, an effective phase difference did not occur in the transmissive area since the slow axis thereof was parallel to the transmission axis of the polarizer on the front. Since this ultraviolet-curable liquid crystal monomer cannot be sufficiently polymerized when oxygen exists, the above-described processes were performed in $N_2$ atmosphere. In addition, since the birefringence $\Delta n$ of RMM 34 is 0.145, the thickness of the retardation layer formed by spin coating was set to 950 nm. Accordingly, the retardation was within the range of 135 nm to 140 nm. After the retardation layer was formed, a counter electrode was formed by sputtering ITO.

Then, normal cell processes were performed. More specifically, an alignment film was formed on the counter electrode by applying polyimide to the counter electrode by printing and rubbing it.

The rubbing direction of the alignment film adjacent to the retardation layer was the same as the orientation of the liquid-crystal polymer on the side facing the retardation layer. In addition, the rubbing direction of the alignment film on the substrate having the TFTs was set antiparallel to the rubbing direction of the alignment film adjacent to the retardation layer.

A liquid-crystal material was injected and sealed between the substrate having the TFTs and the counter substrate having the retardation layer and the polarizer was laminated on the front such that the slow axis of the retardation layer in the transmissive area was parallel to the transmission axis of the polarizer. Accordingly, a liquid crystal panel whose optical construction was the same as that of the liquid crystal display shown in FIG. 12 and which was provided with the color filters was thus obtained. Then, it was experimentally confirmed that high-contrast images could be displayed in both reflective display and transmissive display by using this panel.

Example 10

In Example 10, a full-color liquid crystal panel whose optical construction was the same as that of the liquid crystal display 61 shown in FIG. 15 was manufactured.

First, a substrate having TFTs similar to that shown in FIGS. 26 was formed by processes similar to those of Example 1.

Then, a black matrix composed of Cr was formed on a counter substrate, and red, green, and blue (RGB) filters were formed on the counter substrate in a predetermined pattern. Then, similar to Example 10, an alignment film was formed on the color filters by applying polyimide to the color filters by printing and rubbing it.

Then, an ultraviolet-curable liquid crystal monomer was spin-coated on the alignment film and was subjected to an exposure process, so that a λ/2 layer which served as a retardation layer was formed. The ultraviolet-curable liquid crystal monomer was aligned along the rubbing direction of the alignment film provided under it. Accordingly, although the retardation layer functioned as a λ/2 layer in the reflective area, an effective phase difference did not occur in the transmissive area since the slow axis of the retardation layer was parallel to the transmission axis of the polarizer on the front.

Then, polyimide was applied to the λ/2 layer by printing and was rubbed in a direction at an angle of 60° with respect to the rubbing direction of the above-described alignment film in the reflective area and in a direction parallel to the transmission axis of the polarizer on the front in the transmissive area, so that an alignment film was formed on the λ/2 layer.

Then, an ultraviolet-curable liquid crystal monomer was applied to this alignment film and was subjected to an exposure process, so that a λ/4 layer which served as a retardation layer was formed. The ultraviolet-curable liquid crystal monomer was aligned along the rubbing direction of the alignment film provided under it. Accordingly, although the retardation layer functioned as a λ/4 layer in the reflective area, an effective phase difference did not occur in the transmissive area since the slow axis of the retardation layer was parallel to the transmission axis of the polarizer on the front.

Then, a counter electrode was formed on the λ/4 layer by sputtering ITO.

Then, normal cell processes were performed. More specifically, an alignment film was formed on the counter electrode by applying polyimide to the counter electrode by printing and rubbing it. The rubbing process was performed such that the orientation of the liquid-crystal layer is between λ/2 and λ/4.

The substrate having the TFTs and the counter substrate having the retardation layer were assembled together by normal processes, and the polarizers were laminated on the outer sides of the substrates. The polarizer on the front was arranged such that the transmission axis thereof was at an angle of 15° with respect to the slow axis of the reflective-area λ/2 layer, and the polarizer on the back was arranged such that the transmission axis thereof was at an angle of 90° with respect to the transmission axis of the polarizer on the front. Accordingly, the slow axis of the reflective-area λ/2 layer was parallel to the transmission axis of the polarizer on the front.

Accordingly, a liquid crystal panel whose optical construction was the same as that of the liquid crystal display shown in FIG. 15 and which was provided with the color filters was thus obtained. Then, it was experimentally confirmed that high-contrast images could be displayed in both reflective display and transmissive display by using this panel.

Example 11

Figure 16:
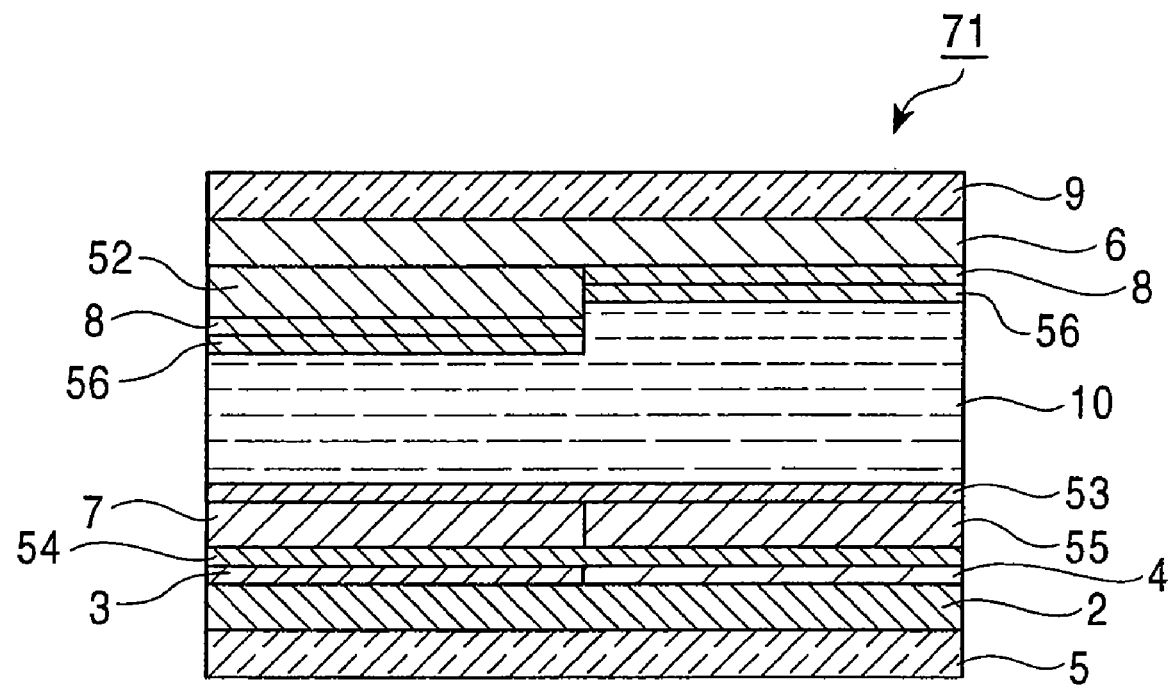
FIG. 16 is a schematic sectional view showing another modification of the liquid crystal display according to the third embodiment.

In Example 11, a liquid crystal panel whose optical construction was the same as that of the liquid crystal display 71 shown in FIG. 16 was manufactured.

First, a substrate having TFTs similar to that shown in FIG. 26 was formed by processes similar to those of Example 1. Then, an λ/4 layer which served as a retardation layer was formed on a reflective electrode and a transparent electrode provided on the substrate by applying an ultraviolet-curable liquid crystal monomer. In this process, in order for the retardation layer to function as a λ/4 layer only in the reflective area, an underlayer thereof was subjected to mask rubbing such that the rubbing direction differs between the reflective area and the transmissive area. Then, an alignment film was formed on the retardation layer by applying polyimide to the retardation layer by printing.

In addition, a counter electrode was formed on a counter substrate by sputtering ITO, and no retardation layer was formed on this substrate. Then, an alignment film was formed on the counter electrode by applying polyimide to the counter electrode by printing and rubbing it.

The substrate having the TFTs and the retardation layer and the counter substrate having the counter electrode were assembled together by normal processes, and a liquid crystal panel was thus obtained. Then, it was experimentally confirmed that, similar to Example 9, high-contrast images could be displayed in transmissive display by using this panel.

Example 12

In Example 12, a liquid crystal display whose optical construction was the same as that of the liquid crystal display 81 shown in FIG. 17 was manufactured.

First, a substrate having TFTs similar to that shown in FIG. 26 was formed by processes similar to those of Example 1.

Then, a black matrix composed of Cr was formed on a counter substrate, and red, green, and blue (RGB) filters were formed on the counter substrate in a predetermined pattern. Then, similar to Example 9, an alignment film was formed on the color filters by applying polyimide to the color filters by printing and rubbing it.

Then, an ultraviolet-curable liquid crystal monomer was applied to the alignment film and was subjected to an exposure process so that λ/4 layers which served as retardation layers was formed. The thickness of each retardation layer was set in accordance with a phase difference of its corresponding pixel. More specifically, the thickness of the retardation layer for a green pixel was set to 950 nm as in Example 1. In addition, the thickness of the retardation layer for a blue pixel was set to 730 nm since the birefringence Δn was about 0.155 according to the retardation at the blue pixel, and the thickness of the retardation layer for a red pixel was set to 1200 nm since the birefringence Δn was about 0.135 according to the retardation at the red pixel.

The ultraviolet-curable liquid crystal monomer was aligned along the rubbing direction of the alignment film provided under it. Accordingly, although the retardation layers functioned as a λ/4 layer in the reflective area, an effective phase difference did not occur in the transmissive area since the slow axes of the retardation layers were parallel to the transmission axis of the polarizer on the front.

After the retardation layers were formed, a counter electrode was formed by sputtering ITO.

The substrate having the TFTs and the substrate having the retardation layer were assembled together by normal processes, and a liquid crystal panel whose optical construction was the same as that of the liquid crystal display 81 shown in FIG. 17 was thus obtained. Then, it was experimentally confirmed that the dark state display could be improved compared to the liquid crystal panel of Example 9 and high-contrast images could be displayed by using this panel.

Example 13

In Example 13, a full-color liquid crystal panel was manufactured similarly to that of Example 10 except that multi-domain alignment of the retardation layer was achieved by a photoalignment process. In Example 13, an alignment film was formed by using a material produced by Vantico Inc.

It was experimentally confirmed that, similar to Example 10, high-contrast images could be displayed in both reflective display and transmissive display by using this panel.

Example 14

In Example 14, a full-color liquid crystal panel whose optical construction was the same as that of the liquid crystal display 51' shown in FIGS. 18A to 18C was manufactured.

First, a substrate having TFTs (TFT substrate) similar to that shown in FIGS. 26 was formed by processes similar to those of Example 1. In this Example, an interlayer film 52 having a thickness corresponding to the difference between the cell gap in the reflective area and that in the transmissive area was provided under a reflective electrode 3 provided on the TFT substrate.

Then, an alignment film 53 was formed by applying polyimide to the reflective electrode 3 and a transparent electrode 4 provided on the TFT substrate and subjecting it to mask rubbing. In the mask rubbing process, the rubbing direction was at an angle of 45° with respect to the transmission axis of a polarizer 5 to be arranged on the outer side of the TFT substrate in the reflective area and was parallel to the transmission axis of the polarizer 5 in the transmissive area.

Then, a reflective-area $\lambda/4$ layer 7, a transmissive-area $\lambda/4$ layer 55, and a counter electrode 8 were formed on a substrate to face the TFT substrate (counter substrate) by processes similar to those of Example 9. The slow axis of the reflective-area $\lambda/4$ layer 7 was set at an angle of 45° with respect to the transmission axis of a polarizer 9 to be arranged on the counter substrate, and the slow axis of the transmissive-area $\lambda/4$ layer 55 was set parallel to the transmission axis of the polarizer 9.

Then, an alignment film 56 was formed on the counter electrode 8 by applying polyimide on the counter electrode 8 and performing mask rubbing such that the rubbing direction was at an angle of 90° with respect to the slow axis of the reflective-area $\lambda/4$ layer 7 in the reflective area and was parallel to the slow axis of the transmissive-area $\lambda/4$ layer 55.

The TFT substrate having the alignment film 53 on the display side thereof and the counter substrate were assembled together by normal processes. The TFT substrate and the counter substrate were laminated to each other such that the alignment direction of the alignment film 53 on the TFT substrate and that of the alignment film 56 on the counter substrate were antiparallel to each other in the reflective area and were at an angle of 90° to each other in the transmissive area and the cell gap was 1.4 μm in the reflective area and 4.0 μm in the transmissive area. Then, a liquid-crystal material whose birefringence Δn was 0.12 was injected and sealed between the substrates, so that a liquid crystal layer 10' having a phase difference of $\lambda/4$ in the reflective area was obtained. Then, the polarizer 5 was adhered to the TFT substrate such that the transmission axis thereof was parallel to the rubbing direction of the alignment film 53 in the transmissive area. In addition, the polarizer 9 was adhered to the counter substrate such that the transmission axis thereof was parallel to the rubbing direction of the alignment film 56 in the transmissive area. A residual phase difference occurred when a voltage was applied was adjusted by the $\lambda/4$ layer.

Accordingly, a liquid crystal panel whose optical construction was the same as that of the liquid crystal display 51' shown in FIGS. 18A to 18C and which was provided with color filters was thus obtained. Then, it was experimentally confirmed that high-contrast images could be displayed in both reflective display in the reflective area and transmissive display in the transmissive area by using this panel. In particular, in transmissive display, the contrast was higher than that obtained in Example 9 (see FIG. 12), and the viewing angle was increased.

In Example 14, another liquid crystal panel including a liquid crystal layer 10' which had a phase difference of $\lambda/4$ in the reflective area was obtained by laminating a TFT substrate and a counter substrate to each other such that the cell gap was 1.8 μm in the reflective area and 4.8 μm in the transmissive area and injecting and sealing a liquid-crystal material whose birefringence Δn was 0.01. As a result, similar effects were also obtained by this panel. Also in this case, a residual phase difference occurred when a voltage was applied was adjusted by the $\lambda/4$ layer.

Example 15

In Example 15, a full-color liquid crystal panel whose optical construction was the same as that of the liquid crystal display 61' shown in FIGS. 21A to 21C was manufactured.

First, a substrate having TFTs and an interlayer film 52 (TFT substrate) similar to that shown in FIGS. 26 was formed by processes similar to those of Example 14, and an alignment film 53 was formed on a reflective electrode 3 and a transparent electrode 4 provided on the TFT substrate. The rubbing direction of the alignment film 53 was at an angle of 15° with respect to the transmission axis of a polarizer 5 to be arranged on the outer side of the TFT substrate in the reflective area and was parallel to the transmission axis of the polarizer 5 in the transmissive area.

Then, a reflective-area $\lambda/2$ layer 22, a reflective-area $\lambda/4$ layer 7, a transmissive-portion $\lambda/2$ layer 62, and a transmissive-area $\lambda/4$ layer 55 were formed on a substrate to face the TFT substrate (counter substrate), and a counter electrode 8 and an alignment film 56 were formed thereon by processes similar to those of Example 10. An alignment film provided under the reflective-area $\lambda/4$ layer 22 was rubbed in a direction such that the slow axis of the reflective-area $\lambda/2$ layer 22 was at an angle of 75° with respect to the transmission axis of a polarizer 9 to be arranged on the outer side of the counter substrate. In addition, an alignment film provided under the reflective-area $\lambda/4$ layer 7 was rubbed in a direction such that the slow axis of the reflective-area $\lambda/4$ layer 7 was at an angle of 60° with respect to the slow axis of the reflective-area $\lambda/2$ layer 22 and 15° with respect to the transmission axis of the polarizer 9. In addition, alignment films under the transmissive-portion $\lambda/2$ layer 62 and the transmissive-area $\lambda/4$ layer 55 were rubbed in directions such that the slow axes of the transmissive-portion $\lambda/2$ layer 62 and the transmissive-area $\lambda/4$ layer 55 were parallel to the transmission axis of the polarizer 9. In addition, the alignment film 56 was rubbed in a direction at an angle of 90° with respect to the slow axis of the reflective-area $\lambda/4$ layer 7 and 75° with respect to the transmission axis of the polarizer 9 in the reflective area, and in a direction parallel to the transmission axis of the polarizer 9 in the transmissive area.

The TFT substrate and the counter substrate having the alignment films 53 and 56, respectively, were assembled together by processes similar to those of Example 14, and a liquid crystal panel whose optical construction was the same as that of the liquid crystal display 61' shown in FIGS. 21A to 21C was thus obtained. Then, it was experimentally confirmed that high-contrast images could be displayed in both reflective display in the reflective area and transmissive display in the transmissive area by using this panel. In particular, in reflective display, the contrast was higher than that obtained in Example 14. In addition, in transmissive display, high contrast was obtained and the viewing angle was increased similar to Example 14.

Example 16

Figure 22:
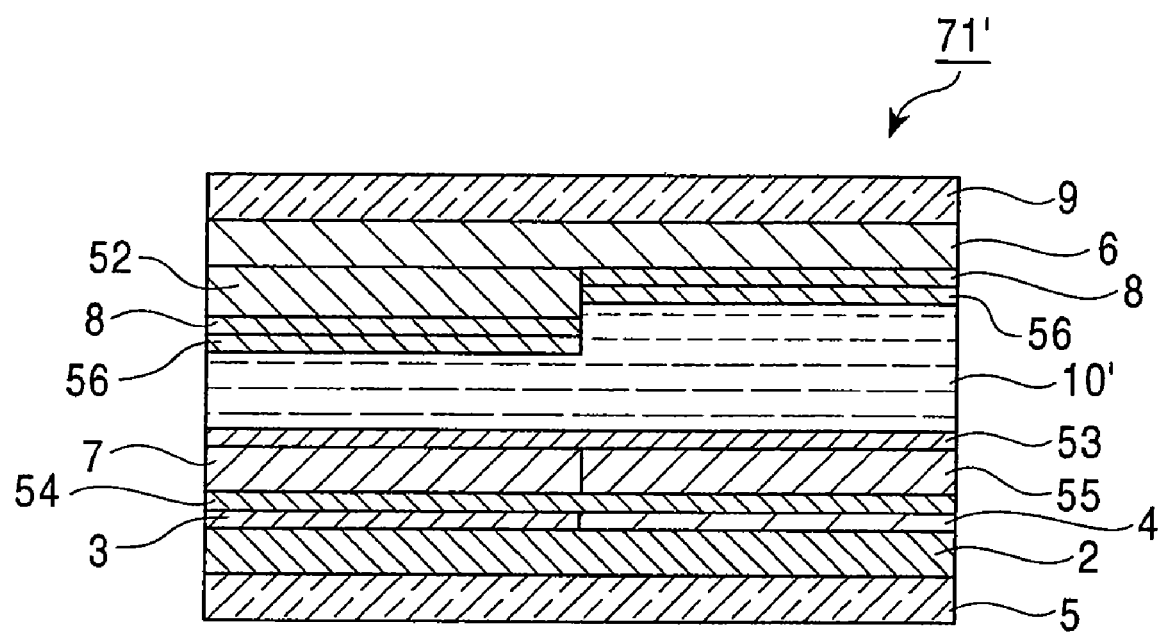
FIG. 22 is a schematic sectional view showing another modification of the liquid crystal display according to the fourth embodiment.

In Example 16, a full-color liquid crystal panel whose optical construction was the same as that of the liquid crystal display 71' shown in FIG. 22 was manufactured. This panel had the same optical construction as that of the liquid crystal panel of Example 14 which is described above with reference to FIGS. 18A to 18C, and was different from the panel of Example 14 in that the retardation layers were provided on the TFT substrate.

First, a substrate having TFTs and an interlayer film 52 (TFT substrate) similar to that shown in FIG. 26 was obtained by processes similar to those of Example 11. Then, a reflective-area λ/4 layer 7 and a transmissive-area λ/4 layer 55 were formed on a reflective electrode 3 and a transparent electrode 4, respectively, which were provided on the TFT substrate, and an alignment film 53 was formed on the reflective-area λ/4 layer 7 and the transmissive-area λ/4 layer 55. The rubbing direction of the alignment film 53 was at an angle of 45° with respect to the transmission axis of a polarizer 5 to be arranged on the outer side of the TFT substrate in the reflective area and was parallel to the transmission axis of the polarizer 5 in the transmissive area.

Then, an interlayer film 52 having a thickness corresponding to the difference between the cell gap in the reflective area and that in the transmissive area was formed on a substrate to face the TFT substrate (counter substrate) in the reflective area by processes similar to those of Example 11. Then, a counter electrode 8 and an alignment film 56 were formed on the counter substrate. The rubbing direction of the alignment film 56 was at an angle of 45° with respect to the transmission axis of a polarizer 9 provided on the outer side of the counter substrate and was antiparallel with respect to the rubbing direction of the alignment film 53 on the TFT substrate in the reflective area, and was parallel to the transmission axis of the polarizer 9 in the transmissive area.

The TFT substrate and the counter substrate having the alignment films 53 and 56, respectively, were assembled together by processes similar to those of Example 14, and a liquid crystal panel whose optical construction was the same as that of the liquid crystal display 71' shown in FIG. 22 was thus obtained. Then, it was experimentally confirmed that, similar to Example 14, high-contrast images could be displayed in both reflective display in the reflective area and transmissive display in the transmissive area by using this panel.

Example 17

In Example 17, a full-color liquid crystal panel whose optical construction was the same as that of the liquid crystal display 81' shown in FIG. 23 was manufactured.

First, a substrate having TFTs (TFT substrate) similar to that shown in FIGS. 26 was formed by processes similar to those of Example 1. In this Example, an interlayer film 52 having a thickness corresponding to the difference between the cell gap in the reflective area and that in the transmissive area was provided under a reflective electrode 3 provided on the TFT substrate shown in FIG. 26.

Then, an alignment film 53 was formed by applying polyimide to the reflective electrode 3 and a transparent electrode 4 provided on the TFT substrate and subjecting it to mask rubbing. In the mask rubbing process, the rubbing direction was at an angle of 45° with respect to the transmission axis of a polarizer 5 to be arranged on the outer side of the TFT substrate in the reflective area and was parallel to the transmission axis of the polarizer 5 in the transmissive area.

Then, red, green, and blue (RGB) filters 42R, 42G, and 42B were formed on a substrate to face the TFT substrate (counter substrate) by processes similar to those of Example 12 (see FIG. 17), and reflective-area λ/4 layers 7R, 7G, and 7B and transmissive-area λ/4 layers 55R, 55G, and 55B whose thicknesses were set in accordance with the retardation of their respective colors were formed on the color filters 42R, 42G, and 42B, respectively. Then, an alignment film 56 was formed on the reflective-area λ/4 layers 7R, 7G, and 7B and the transmissive-area λ/4 layers 55R, 55G, and 55B with an overcoat layer 43 and a counter electrode 8 therebetween. The slow axes of the reflective-area λ/4 layers 7R, 7G, and 7B were at an angle of 45° with respect to the transmission axis of a polarizer 9 to be arranged on the outer side of the counter electrode, and those of the transmissive-area λ/4 layers 55R, 55G, and 55B were set parallel to the transmission axis of the polarizer 9. In addition, the alignment film 56 was rubbed in a direction at an angle of 90° with respect to the slow axes of the reflective-area λ/4 layers 7R, 7G, and 7B in the reflective area and in a direction parallel to the slow axes of the transmissive-area λ/4 layers 55R, 55G, and 55B in the transmissive area. The optical axes and the rubbing directions were the same as those in the liquid crystal panel of Example 14 which is described above with reference to FIG. 18. In addition, the thicknesses of the retardation layers were set in accordance with the retardation of their respective colors.

The TFT substrate and the counter substrate having the alignment films 53 and 56, respectively, were assembled together by processes similar to those of Example 14, and a liquid crystal panel whose optical construction was the same as that of the liquid crystal display 81' shown in FIG. 23. Then, it was experimentally confirmed that the dark state display could be improved compared to Example 14 and high-contrast images could be displayed in both reflective display in the reflective area and transmissive display in the transmissive area by using this panel.

Example 18

In Example 18, a full-color liquid crystal panel was manufactured similarly to that of Example 15 except that multi-domain alignment for aligning the retardation layer in different directions between the reflective area and the transmissive area was achieved by a photoalignment process. In the photoalignment process, the transmissive area and the reflective area were irradiated with light of different polarizations by mask exposure, so that the reflective-area λ/4 layer and the transmissive-area λ/4 layer were aligned in directions similar to those in Example 18.

It was experimentally confirmed that, similar to Example 15, high-contrast images could be displayed in both reflective display and transmissive display by using this panel.

Example 19

In Example 19, a full-color liquid crystal panel whose optical construction was the same as that of the liquid crystal display 61a shown in FIGS. 24A to 24C was manufactured.

First, a substrate having TFTs and an interlayer film 52 (TFT substrate) similar to that shown in FIGS. 26 was formed by processes similar to those of Example 14, and an alignment film 53 was formed on a reflective electrode 3 and a transparent electrode 4 provided on the TFT substrate. The rubbing direction of the alignment film 53 was at an angle of 37.5° with respect to the transmission axis of a polarizer 5 to be arranged on the outer side of the TFT substrate in the reflective area and was parallel to the transmission axis of the polarizer 5 in the transmissive area.

Then, a reflective-area $\lambda/2$ layer 22, a reflective-area $\lambda/4$ layer 7, a transmissive-portion $\lambda/2$ layer 62, and a transmissive-area $\lambda/4$ layer 55 were formed on a substrate to face the TFT substrate (counter substrate), and a counter electrode 8 and an alignment film 56 were formed thereon by processes similar to those of Example 15 (see FIG. 21C). The alignment film 56 was rubbed in a direction at an angle of 22.5° with respect to the slow axis of the reflective-area $\lambda/4$ layer 7 in the reflective area and in a direction parallel to the transmission axis of a polarizer 9 in the transmissive area.

The TFT substrate and the counter substrate having the alignment films 53 and 56, respectively, were assembled together by processes similar to those of Example 14. The TFT substrate and the counter substrate were laminated to each other such that the angle between the rubbing directions of the alignment films 53 and 56 was 45° in the reflective area and 90° in the transmissive area and the cell gap was 2.7 μm in the reflective area and 4.8 μm in the transmissive area. Then, a liquid-crystal material whose birefringence Δn was 0.10 was injected and sealed between the substrates. Then, the polarizer 5 was adhered to the TFT substrate such that the transmission axis thereof was parallel to the rubbing direction of the alignment film 53 in the transmissive area. In addition, the polarizer 9 was adhered to the counter substrate such that the transmission axis thereof was parallel to the rubbing direction of the alignment film 56 in the transmissive area.

Accordingly, a liquid crystal panel whose optical construction was the same as that of the liquid crystal display 61*a* shown in FIGS. 24A to 24C and which was provided with color filters was thus obtained. Then, it was experimentally confirmed that, similar to Example 15, high-contrast images could be displayed in both reflective display in the reflective area and transmissive display in the transmissive area by using this panel. In addition, since the liquid crystal layer in the reflective area was in the twisted nematic state and the allowance for the cell gap was increased compared to that in Example 15, the yield of the liquid crystal panel was increased.

In Example 19, another full-color liquid crystal panel whose optical construction was the same as that of the liquid crystal display 6 la shown in FIGS. 25A to 25C was obtained by laminating a TFT substrate and a counter substrate to each other such that the angle between the alignment direction of the alignment film 53 on the TFT substrate and that of the alignment film 56 on the counter electrode was 90° in both the reflective and transmissive areas and the cell gap was 3.3 μm in the reflective area and 4.8 μm in the transmissive area and injecting and sealing a liquid-crystal material whose birefringence Δn was 0.10. As a result, similar effects were also obtained by this panel.

What is claimed is:

1. A liquid crystal display comprising:
   first and second substrates;
   a liquid crystal layer interposed between the first and second substrates, the liquid crystal display having a plurality of reflective areas and a plurality of transmissive areas, each reflective area having a reflective electrode on the second substrate and each transmissive area having a transparent electrode on the second substrate;
   a plurality of retardation films provided on an alignment film of the first substrate, at least two of the retardation films being provided on the first substrate opposite the reflective electrode of the corresponding reflective area and separated from the reflective electrode by the liquid crystal layer, at least two other of the retardation films being provided on the first substrate opposite the transparent electrode of the corresponding transmissive area and separated from the transparent electrode by the liquid crystal layer;
   the plurality of retardation films being separated by another alignment film;
   at least one interlayer positioned in the reflective area between the reflective electrode and the second substrate; and
   the liquid crystal layer has a phase difference of $\lambda/4$ in the reflective area and a phase difference of $\lambda/2$ in the transmissive area when no voltage is applied or when a voltage is applied,
   wherein,
      one of the at least two of the retardation films provided opposite the reflective electrode comprises a $\lambda/4$ layer,
      at least one of the alignment films includes a multi-domain alignment such that an alignment direction differs between the reflective areas and the transmissive areas, and
      the at least one interlayer has a thickness corresponding to the difference between the thickness of the liquid crystal layer in the reflective area and that in the transmissive area.

2. A liquid crystal display comprising:
   first and second substrates;
   a liquid crystal layer interposed between the first and second substrates, the liquid crystal display having a plurality of reflective areas and a plurality of transmissive areas, each reflective area having a reflective electrode on the second substrate and each transmissive area having a transparent electrode on the second substrate;
   a plurality of retardation films provided on an alignment film of the first substrate, each retardation film having a phase difference corresponding to a transmission wavelength of light associated with the respective retardation film, the respective phase difference effected by a thickness of the respective retardation film, at least two of the retardation films being provided on the first substrate opposite the reflective electrode of the corresponding reflective area and separated from the reflective electrode by the liquid crystal layer, at least two other of the retardation films being provided on the first substrate opposite the transparent electrode of the corresponding transmissive area and separated from the transparent electrode by the liquid crystal layer;
   the plurality of retardation films being separated by another alignment film;
   at least one interlayer positioned in the reflective area between the reflective electrode and the second substrate; and
   the liquid crystal layer has a phase difference of $\lambda/4$ in the reflective area and a phase difference of $\lambda/2$ in the transmissive area when no voltage is applied or when a voltage is applied,
   wherein,
      one of the at least two of the retardation films provided opposite the reflective electrode comprises a $\lambda/4$ layer,
      at least one of the alignment films includes a multi-domain alignment such that an alignment direction differs between the reflective areas and the transmissive areas, and the at least one interlayer has a thickness corresponding to the difference between the thickness of the liquid crystal layer in the reflective area and that in the transmissive area.

3. A liquid crystal display according to claim 2, wherein at least one of the retardation films is provided on a surface of the first substrate which faces the liquid crystal layer.

4. A liquid crystal display according to claim 2, wherein at least one of the retardation films further comprises a retardation layer which compensates for chromatic dispersion which occurs at the λ/4 layer.

5. A liquid crystal display according to claim 4, wherein the retardation layer comprises a λ/2 layer.

6. A liquid crystal display according to claim 2, wherein at least one of the retardation films is composed of a liquid crystal polymer.

7. A liquid crystal display according to claim 6, wherein the liquid crystal polymer is obtained by curing an ultraviolet-curable liquid crystal monomer in a nematic phase.

8. A liquid crystal display according to claim 2, wherein at least one of the first and second substrates is provided with color filters and the phase difference of at least one of the retardation films is determined in accordance with the wavelength of each color filter.

9. A liquid crystal display according to claim 8, wherein the retardation film has a phase difference of λ/4 in accordance with the wavelength of each color filter.

10. A liquid crystal display according to claim 2, wherein the phase difference of one of the retardation films in the transmissive area cancels a residual phase difference which occurs when a sufficient voltage is applied to the liquid crystal layer.

11. A method for manufacturing a liquid crystal display (1) which has first and second substrates and a liquid crystal layer interposed between the first and second substrates and (2) which has a plurality of reflective areas and a plurality of transmissive areas, each reflective area having a reflective electrode on the second substrate and each transmissive area having a transparent electrode on the second substrate, the method comprising:

forming a plurality of retardation films on an alignment film of the first substrate such that each of the plurality of retardation films having a phase difference corresponding to a transmission wavelength of light associated with the respective retardation film, the respective phase difference effected by a thickness of the respective retardation film, at least two of the retardation films being provided on the first substrate opposite the reflective electrode of the corresponding reflective area and separated from the reflective electrode by the liquid crystal layer, at least two other of the retardation films being provided on the first substrate opposite the transparent electrode of the corresponding transmissive area and separated from the transparent electrode by the liquid crystal layer;

the plurality of retardation films being separated by another alignment film;

at least one interlayer positioned in the reflective area between the reflective electrode and the second substrate; and the liquid crystal layer has a phase difference of λ/4 in the reflective area and a phase difference of λ/2 in the transmissive area when no voltage is applied or when a voltage is applied, wherein, one of the at least two of the retardation films provided opposite the reflective electrode comprises a λ/4 layer, at least one of the alignment films includes a multi-domain alignment such that an alignment direction differs between the reflective areas and the transmissive areas, and the at least one interlayer has a thickness corresponding to the difference between the thickness of the liquid crystal layer in the reflective area and that in the transmissive area.

12. A method for manufacturing a liquid crystal display according to claim 11, wherein the step of patterning the retardation film comprises an exposure process and a development process.

* * * * *